(12) United States Patent
Campbell et al.

(10) Patent No.: US 12,081,683 B2
(45) Date of Patent: Sep. 3, 2024

(54) USER DATA MANAGEMENT FOR AUGMENTED REALITY USING A DISTRIBUTED LEDGER

(71) Applicant: Magic Leap, Inc., Plantation, FL (US)

(72) Inventors: John Campbell, Boca Raton, FL (US); Daniel Olshansky, Mountain View, CA (US); Michael Loyal Kerr, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 314 days.

(21) Appl. No.: 17/630,483

(22) PCT Filed: Jul. 29, 2020

(86) PCT No.: PCT/US2020/044086
§ 371 (c)(1),
(2) Date: Jan. 26, 2022

(87) PCT Pub. No.: WO2021/021942
PCT Pub. Date: Feb. 4, 2021

(65) Prior Publication Data
US 2022/0255763 A1 Aug. 11, 2022

Related U.S. Application Data

(60) Provisional application No. 62/881,025, filed on Jul. 31, 2019.

(51) Int. Cl.
*H04L 9/00* (2022.01)
*G06F 1/16* (2006.01)
(Continued)

(52) U.S. Cl.
CPC ............... *H04L 9/50* (2022.05); *G06F 1/163* (2013.01); *G06F 21/6245* (2013.01); *H04L 9/30* (2013.01)

(58) Field of Classification Search
CPC ... H04L 9/50; H04L 9/30; G06F 1/163; G06F 21/6245; H04W 12/02
See application file for complete search history.

(56) References Cited

U.S. PATENT DOCUMENTS 6,850,221 B1  2/2005 Tickle
9,704,143 B2  7/2017 Walker et al.
(Continued)

FOREIGN PATENT DOCUMENTS

WO  WO 2015/188277  12/2015
WO  WO 2018/170504   9/2018
(Continued)

OTHER PUBLICATIONS

International Search Report and Written Opinion for PCT Application No. PCT/US20/44086, mailed Dec. 3, 2020.
(Continued)

*Primary Examiner* — Shirley X Zhang
(74) *Attorney, Agent, or Firm* — Seed IP Law Group LLP

(57) ABSTRACT

Disclosed herein are systems and methods for setting, accessing, and modifying user privacy settings using a distributed ledger. In an aspect, a system can search previously stored software contracts to locate an up-to-date version of a software contract associated with a user based on a request for access to user data for the particular user. Then, the system determines that the user data is permitted to be shared. The system transmits, to a data virtualization platform, instructions to extract encrypted user data from a data platform. The system can then make available, to a data verification system, a private encryption key and details associated with the software contract to verify that the private encryption key and the user data match. Then the system transmits, to the data virtualization platform, the
(Continued)

private encryption key so that the data virtualization platform can decrypt the encrypted user data.

20 Claims, 12 Drawing Sheets

(51) Int. Cl.
    *G06F 21/62*     (2013.01)
    *H04L 9/30*     (2006.01)
    *H04W 12/02*     (2009.01)

(56) References Cited

U.S. PATENT DOCUMENTS

| | | |
|---|---|---|
| 10,135,607 B1 | 11/2018 | Roets |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2018/0260876 A1* | 9/2018 | Graham ............... H04L 9/32 |
| 2020/0034550 A1* | 1/2020 | Kim ............... H04L 9/085 |
| 2020/0312047 A1* | 10/2020 | Goluguri ............... G07C 5/008 |

FOREIGN PATENT DOCUMENTS

| | | |
|---|---|---|
| WO | WO 2018/218155 | 11/2018 |
| WO | WO 2021/021942 | 2/2021 |

OTHER PUBLICATIONS

International Preliminary Report on Patentability for PCT Application No. PCT/US20/44086, issued Feb. 1, 2022.
AlixPartners, "The Race to Patent the Blockchain," Insight, Financial Advisory Services, Sep. 2016.
Araoz, "Proxy Libraries in Solidity," Zeppelin Blog, in 6 pages, Mar. 6, 2017. Https://blog.zeppelin.solutions/proxy-libraries-in-solidity-79fbe4b970fd.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chain, "Digitize with Sequence," Chain 2018. URL: https://chain.com/[May 16, 2019 2:25:54 PM], downloaded May 16, 2019 in 2 pages.
Chaudhry, "The Patentability of Blockchain Technology and the Future of Innovation," Landslide, https://americanbar.org/groups/intellectual_property_law/publications/landslide/2017-18/march-april/patentability-blockchain-technology-future-in...2018. Published in Landslide, vol. 10, No. 4, Mar./Apr. 2018, by the American Bar Association.
Copeland, et al., The GNU Privacy Handbook, 1999, https://www.gnupg.org/gph/en/manual.html, in 35 pages, downloaded on May 16, 2019.
Ethereum—"Can contracts pay the gas instead of the message sender,?" URL: https://ethereum.stackexchange.com/questions/144/can-contracts-pay-the-gas-instead-of-the-message-sender[May 16, 2019 1:34:27 PM], downloaded May 16, 2019 in 12 pages.
Filecoin, "Introducing Filecoin, a decentralized storage network," Original filecoin whitepaper 2014, URL: https://filecoin.io, downloaded on May 16, 2019 in 11 pages.
IPFS Corporation, "Insurance Premium Financing," 2019, URL: https://www.ipfs.com/[May 16, 2019 2:01:00 PM], downloaded May 16, 2019 in 3 pages.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Miller, "Tide Foundation gives consumers full control of personal data on blockchain," 2019, URL: https://techcrunch.com/2019/03/04/tide-foundation-gives-consumers-control-over-personal-data-on-blockchain/[May 16, 2019 1:42:30 PM], downloaded May 16, 2019 in 9 pages.
Openzeppelin, "Build Secure Smart Contracts in Solidity," [Need Date], URL: https://openzeppelin.org, downloaded May 16, 2019 in 5 pages.
Storj, "Introducing Tardigrade.io Decentralized Cloud Storage," 2019, URL: https://storj.io, downloaded May 16, 2019 in 9 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Tide, "Privacy is more than a human right, it's an asset," 2019, URL: https://tide.org/[May 16, 2019 1:48:44 PM], downloaded May 16, 2019 in 7 pages.
Uport, Security System for the Decentralized Web, URL: https://www.uport.me, 2018, downloaded May 16, 2019 in 5 pages.

* cited by examiner

USER DATA MANAGEMENT FOR AUGMENTED REALITY USING A DISTRIBUTED LEDGER

CROSS-REFERENCE TO RELATED APPLICATIONS

This application claims the benefit of priority to U.S. Patent Application No. 62/881,025, filed Jul. 31, 2019, entitled USER DATA MANAGEMENT FOR AUGMENTED REALITY USING A DISTRIBUTED LEDGER, which is hereby incorporated by reference herein in its entirety.

LIMITED COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records, but otherwise reserves all copyrights whatsoever.

FIELD

The present disclosure relates to systems and methods for secure data storage, transfer, and access, and in particular to systems and methods for rules-based storage, transfer, and access of data. The systems and methods can be used in an augmented, mixed, or virtual reality environment.

BACKGROUND

Companies collect vast amount of user data on their users or customers. This user data can be used to build computer models, for targeting advertisements, or statistical analysis, for example. Companies collect and sell this user data for profit, which may come at the cost of user's privacy and may be without user's knowledge. Recently, many companies that collect and sell user data have either sold data in a misleading way or have been breached or hacked by third parties who have stolen the data to later sell on a black market.

SUMMARY

Disclosed herein are systems and methods for setting, accessing, and modifying user privacy settings using a distributed ledger. In an aspect, a system can receive privacy settings associated with a user, and create a software contract based at least in part on the privacy settings. The system can then create private key and a public key. The system can store the software contract and private key in a distributed ledger, and transmit the public key to a device that is configured to collect user data and semantically tag the user data with metadata.

In another aspect, a system can receive, from a data virtualization platform, a request for access to user data for a particular user. Then, the system can search previously stored software contracts to locate the most up-to-date version of a software contract associated with the user, and, based on the search, determine that the user data is permitted to be shared. The system can then transmit, to the data virtualization platform, instructions on how to extract the user data from a data platform. Then, the system can receive, from the data platform, a confirmation that the user data was transmitted to the data virtualization platform, and then the system can access a private encryption key and software contract associated with the user. The system can then transmit, to the data verification system, the private encryption key and details associated with the software contract, and then receive, from the data verification system, an indication that the private encryption key and the user data match. Then, based on the received indication that the private encryption key and the user data match, transmit, to the data virtualization platform, the private encryption key so that the data virtualization platform can decrypt the encrypted user data received from the data platform.

In yet another aspect, a system can receive, from a data virtualization platform, a request for access to user data associated with a particular user. Then, the system can search previously stored software contracts to locate a software contract associated with the user, and, based on the search, determine that the user data is permitted to be shared. In some aspects, the user data can include third party data from one or more third party services. The system can then prepare and transmit, to the data virtualization platform, instructions on how to extract the third party data from the one or more third party services, and receive, from the data virtualization platform, a notice that the third party data has been successfully retrieved by the data virtualization platform. Upon receiving the notice, the system can retrieve a public encryption key from the software contract, and transmit, to the data virtualization platform, the public encryption key so that the data virtualization platform can encrypt the third party data and transmit, to the data platform, the third party data for storage.

The augmented reality, virtual reality, and mixed reality systems described herein are merely as examples and should not be construed as limiting embodiments or aspects to the particular technology described. Thus, it should be appreciated that although augmented reality, virtual reality, and mixed reality systems are described herein, the embodiments and disclosure can be applied to any consumer electronic device collects or generates data.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the subject matter of the disclosure. Additional embodiments of the disclosure are described below in reference to the appended claims, which may serve as an additional summary of the disclosure.

Figure 1:
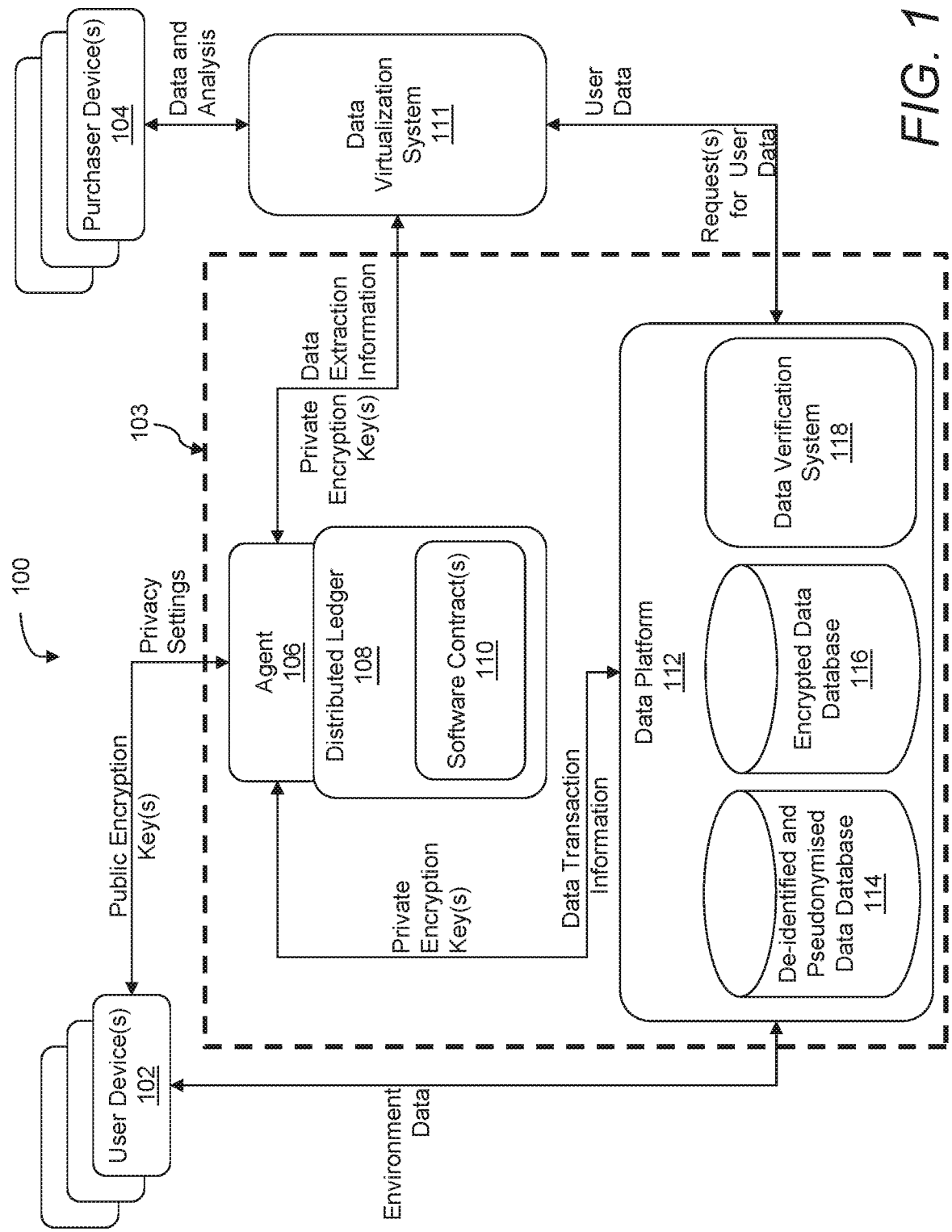
FIG. 1 illustrates an example of a user data transaction system and includes examples of interactions and data transfer among components of the system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Spatial computing devices, and companies that provide such devices to the companies' users or customers, can collect user data related to such users, which can include environment data, or data based on the surrounds of the spatial computing device. The type of user data a user will be generating and interacting with on a spatial computing device may be much more sensitive and valuable than what is available on many other platforms or services today. For example, the user data is more sensitive, because it may provide information about a user's environment (e.g., the user's home, bedroom, office, nearby people's faces and bodies, or the like) and the user's personal identity (e.g., the user's personal preferences about products, people, places, the user's personally identifying data, or the like). The user data may also provide information about a user's physical capabilities (e.g., whether the user requires glasses, or the prescription a user may require, a user's height, a user's weight, a user's stride, how the user's body looks, or the like). In some examples, the user data may provide information about a user's health (e.g., heartbeat, analysis of a user's blood through the skin of the user, or the like). It can be desirable to protect this information in a way that provides control of how the user data is used. It can be advantageous for the spatial computing device, or associated systems, to permit the user to control the protection level(s) for this information, so that the user is in control of the data collection and/or sharing of user data based on the user's personal privacy preferences. For example, in some embodiments, a user can provide updatable privacy settings that can be stored on an immutable distributed ledger where additional changes to the privacy setting can be added to a new storage location and where prior privacy settings can also be reviewed.

Through the use of public-key cryptography and public distributed ledger technology (e.g., Blockchain, Bitcoin, Ethereum, Tangle, or the like) with support for software contracts (e.g., smart contracts, or the like), a user can maintain control and privacy of their own data. For example, the user can control whether their data (e.g. user data collected from them) is available or shared at all, manage who has access to it, manage what portion of data is accessible or shared, manage what portion of data is accessible to who, and the user can benefit from providing access to some or all of the data. Additionally, the systems and methods described here can also foster trust between the provider of such a service (e.g., a company that collects or collected user data, a third party company hired to manage user data, or the like) with those who choose to use a device that collects user data.

A combination of the software contracts (e.g., smart contracts, Ethereum smart contracts, Turing complete smart contracts, or the like), and the key cryptography can provide a solution that can scale to include the most prolific of data sets. The systems and methods described herein can provide a user-friendly way to maintain access to, control of, a user's user data.

In some embodiments, key cryptography (e.g., public key cryptography, or the like) can be configured to generate a pair of encryption keys: a public key and a private key for each user of a platform. The public key can be shared publically, but the private key is intended to remain only in the control of the user. One benefit of key cryptography can include data confidentiality so that user data is kept private. For example, a user can encrypt their user data using their previously generated public key, and only the user will be able to decrypt the user data at a later point in time using their private key. Another benefit of key cryptography can include data authenticity, where a user can digitally sign some piece of data using their private key in order to prove that they authored it.

A distributed ledger in conjunction with software contract support can provide a permissionless, trustless, censorship resistant, and immutable ledger that can be configured to track a state of account balances and facilitates the transition of a smart contract from one valid state to another. A distributed ledger, sometimes referred to as a shared ledger or distributed ledger technology or DLT, and which can also include the tangle and other forms of distributed storage, can be a consensus of replicated, shared, and synchronized digital data geographically spread across multiple sites, countries, or institutions. One form of distributed ledger design is the blockchain system, which can be either public or private. The ledger may be distributed in a peer-to-peer network and may comprise a distributed database spread across several nodes (devices), a directed acyclic graph (DAG), or other data structure. Data confidentiality and authenticity, as described, can be provided by a distributed ledger, and can also be used outside the context of a distributed ledger via key cryptography. In the context of information security, a distributed ledger can also provide improved data integrity and non-repudiation. One benefit of a public distributed ledger technology can include, for example, data integrity by ensuring that data was not manipulated without permission. Another benefit of a public distributed ledger technology can include, for example, data availability and accessibility where a user, through the user of the internet, can connect and access data on a distributed ledger. For example, a central organization cannot block or grant special privileges to any party for a distributed ledger. Another benefit of a public distributed ledger technology can include, for example, censorship resistance. For example, a central organization cannot control who can and cannot store data on the blockchain.

Currently, distributed ledger technology has its limitations. For example, the technology can be expensive (e.g., transaction fees may be high), not entirely secure (e.g., 51% attacks, possibility of a chain fork, or the like), not entirely scalable, and slower than a traditional centralized service with a database. Improvements to distributed ledger technology are being worked on and can impact the systems and methods described herein. The current limitations on the distributed ledger technology should not be interpreted as limitations on the systems and methods described herein.

The improvements to the distributed ledger technology will translate into improvements to the systems and methods described herein. For example, some improvements may include: lower transaction fees, increased security (e.g., achieve blockchain finality, be resistant to 51% attacks, limit the possibility of a fork, or the like), increased scalability (e.g., through the use and implementation of shardings, different consensus mechanisms, or the like), or other new features or benefits that may directly or indirectly improve the systems and methods described herein.

Currently, because storing large amounts of data on a distributed ledger can be expensive or cumbersome, it is desired to implement a solution that stores the data on a secure server with a database but can store a user's privacy settings on a distributed ledger. However, it should be appreciated that as distributed ledger technology improves, a user's privacy settings and user data can both be stored and accessed via a distributed ledger.

Additionally, design of computer user interfaces that are useable and easily learned by humans can be challenging. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, or the like, for a user. For example, user interaction with the interactive user interfaces described herein may provide an optimized display of resource dependency, or data transformation, relationships and may enable a user to more quickly access, navigate, assess, and digest such information than previous systems.

One benefit of the systems and methods described herein is that the operator of the data platform, services associated with the spatial computing device, and any related services collecting user data, will not have direct access to the user data because the data will be encrypted and the operator will not have the appropriate key(s) to decrypt the user data. For example, a benefit of such an implementation is that during a breach, if user data is stolen, based on the encryption, it would be difficult to near impossible for the user data to be decrypted without the proper key(s). Additionally, if a governmental entity subpoenas user data from the operator, it would be impossible for the operator to decrypt the user data and comply with such a subpoena. This would enable the operator to avoid the public relations issues of divulging such sensitive user data.

In some situations, a user must trust that whoever hosts their user data does not modify or mishandle the user data in any way. Since the user can store a hash of their user data to a blockchain before uploading their user data, it is easy to verify if their user data has been tampered with. For example, a new hash of the uploaded user data can be determined and compared with the stored hash. Thus, another benefit of the systems and methods described herein is that there can be a verification procedure to verify whether user data was modified.

In some embodiments, private key recovery options may be available should a user lose or forget their private key. For example, using a series of two-factor authentication mechanisms (e.g., email, Facebook, SMS, phone, phone a friend, or the like), a user is able to retrieve access to their private keys associated with their account across different devices. This will permit the same user to be logged in on different devices and different platforms.

In some embodiments, there may be an issue with the entity sponsoring or hosting the user data unilaterally destroying or blocking access to the user data. However, in some embodiments, decentralized cloud storage solutions can be implemented (e.g., Sia, Storj, Filecoin, and/or IPFS, for example). Encrypted user data could be stored on the decentralized cloud and the sponsoring or hosting entity would have little to no control over the stored user data.

Additionally, in some embodiments, although a user may permit access by a third party to user data and such user data may only be accessible temporarily, the third party may still misuse the user data. In some embodiments, a decentralized escrow-like mechanism can be implemented to settle disputes of mishandled user data. After the user grants a third party permission to access the user's user data, the third party receiving or accessing the user data would be required to stake some amount of coins, tokens, or funds in promise of not misusing the user data (e.g., sharing or selling the user data with other unauthorized third parties, inadequate or negligent protection of the user data from breaches or unauthorized access, or the like). If the user makes a claim that the third party, whom the user granted access to, broke a preconfigured privacy agreement, for example, a decentralized autonomous organization (DAO) can decide who is at fault (e.g., OpenZeppelin and Aragon provide platforms to permit DAOs to make such decisions). If it is decided that there was a breach of privacy, for example, the tokens staked by the third party can either be burnt or deleted, or sent to the user. This incentivizes third parties not to mishandle user data. Alternatively, any third party could be mandated to stake a very large portion of the funds they own. If the third party breaches the privacy of any of the users with whom the third party is transacting, the DAO can make a decision if the third party was at fault. If the third party is at fault, all the staked funds would either be burnt or deleted, or shared amongst the users affected. This will incentivize the third party not to breach the trust of any of the users because if the staked sum is large enough, it could harm the third party.

In some embodiments, distributed systems are often designed to be fault-tolerant. So if one of the nodes in the cluster is down, the system remains fully functional in the eyes of end users. However, if a node continues functioning properly, acts as if it is functioning correctly, but advertently performs a different function, it could harm the integrity of the data and/or affect the user's experience. Accounting for such misbehaving nodes is called byzantine fault tolerance, for example. Though there are many different forms of consensus protocols, Proof-of-Stake (PoS) and Proof-of-Work (PoW) are two of the most common ones because they account for byzantine fault tolerance. For example, PoW accounts for byzantine fault tolerance by forcing misbehaving miners to spend an exhaustive amount of computing resources if they want to compute blocks faster than the rest of the network. Rather than trying to attack the network, the attacker (e.g., a misbehaving miner, or the like) could make more money by supporting the network as a fair miner. In another example, PoS accounts for byzantine fault tolerance by forcing the miners to stake a large sum of funds if the miners want to generate blocks. If another miner, or a different full node, tries to verify a corresponding blockchain and sees that one of the miners misbehaved and computed an incorrect block, they will signal to the rest of the network. Rather than trying to attack the network, the attacker (e.g., a misbehaving miner, or the like) could make more money by supporting the network as a fair miner.

In some embodiments, the architecture described herein can support object recognizers (ORs) that are dependent on a user's sensor data. In some examples, if a spatial computing device provider hosts third party ORs on the provider's server, then the provider has to be able to decrypt the user's data at some point in time. This means that no external ORs can run without the provider having direct access to the user's data. In another example, if the provider chooses to let third parties run ORs on their own servers, and give the user control regarding which third parties have access to the user's user data, then the user has the option of permitting a third party access to the user's user data without the provider ever being able to decrypt the user data.

Example User Data Transaction System

FIG. 1 illustrates an example of a user data transaction system 100 and includes examples of interactions and data transfer among components of the system. For example, how the internal components or systems of the user data transaction system 100 interact, and what data is transferred between the components or systems. The agent 106, distributed ledger 108, and software contract(s) 110 may be the same as the agent, distributed ledger, and software contract(s) described herein (e.g., with respect to other embodiments and examples) are components or systems of the user data transaction system 100. Also, systems and components described can include one component or many components. The components described herein are not meant to be exhaustive but only a sample of what components may be implemented. Some components may be combined and others may be removed or substituted with similar components. Also, some components can be a part of one system or a part of multiple systems connected and working together to achieve the same of similar functions.

Example Agent

Figure 7A:
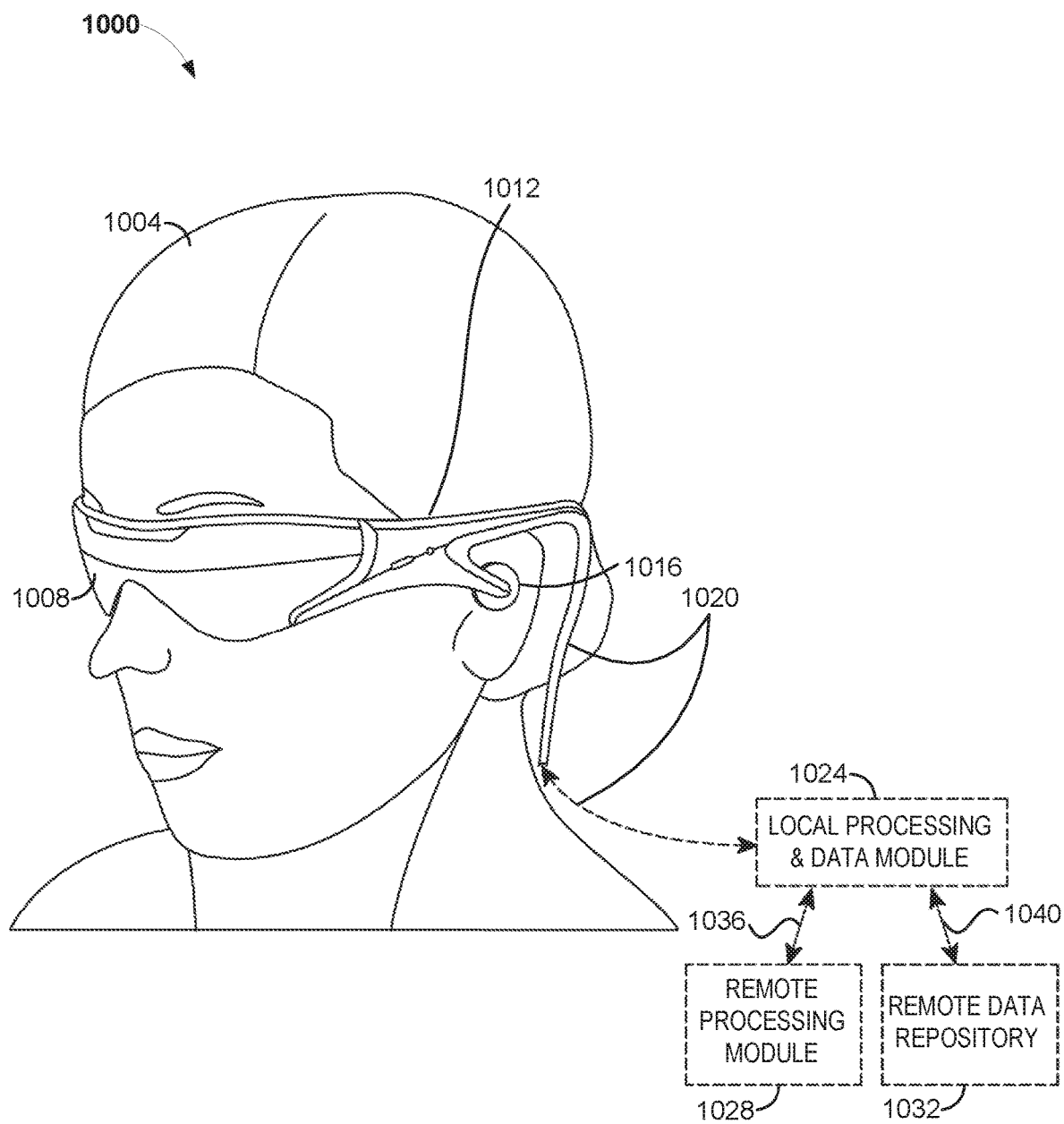
FIG. 7A illustrates an example of a spatial computing device or wearable display system.

In some embodiments, an agent 106 can be in electronic communication with various systems that can include a distributed ledger 108, a data platform 112, a data virtualization system 111, and user devices 102 (e.g., cellular telephones, tablet computers, e-readers, smart watches, head mounted augmented, virtual, or mixed reality display systems, wearable display systems, the wearable display system 1000 of FIG. 7A, or the like). In some embodiments, the agent 106 can comprise multiple systems connected via a local area network or via the internet. Also, in some embodiments, for example, the agent 106, or portions thereof, can be located on the user device(s) 102, the data platform 112, the data virtualization system 111, or purchaser device(s) 104. For example, user data privacy system 103, which includes the agent 106 and the data platform 112 can comprise a privacy-centric data storage solution. The privacy-centric data storage solution can be private, public, or a combination of private components and public components. In some embodiments, data or information (e.g., user data or the like) can be accessed from the privacy-centric data storage solution (or components thereof) through the use of application programming interface (API) calls. The agent 106 can determine what information it receives from the various systems to process and store in a distributed ledger (e.g., a blockchain, a tangle, or the like).

In some embodiments, the agent 106 can receive data or instructions from the various systems that it may use to generate a software contract 110 (e.g., a smart contract or the like) and store the software contract 110 in the distributed ledger 108. For example, the agent 106 can received privacy setting instructions from a user device 102, the agent 106 can then process the instructions and generate a smart contract that captures the privacy setting instructions, and then the agent 106 can write the smart contract to a blockchain. The types of data that are transmitted and received by the various systems, including the agent 106, are described in more detail with respect to the flow charts in FIGS. 2-6.

In addition to generating and storing a software contract 110 on a distributed ledger 108, the agent 106 can also generate private keys and public keys. As discussed herein, key cryptography (e.g., public key cryptography, or the like) can be configured to generate a pair of encryption keys: a public key and a private key for each user of a platform. The public key can be shared publically, but the private key is intended to remain only in the control of the user. One benefit of key cryptography can include data confidentiality so that user data is kept private. For example, a user can encrypt their user data using their previously generated public key, and only the user will be able to decrypt the user data at a later point in time using their private key. Another benefit of key cryptography can include data authenticity, where a user can digitally sign some piece of data using their private key in order to prove that they authored it. The private and public keys can be stored in the distributed ledger 108 or software contract 110, and associated with a user the keys were generated for. The private and public keys can be retrieved from the distributed ledger 108 or software contract 110 and transmitted to various systems as described in more detail herein. The private keys can be transmitted to or received from a data virtualization system 111, a data platform 112, and/or user device(s) 102, for example.

The agent 106 can read the software contracts 110 stored in the distributed ledger 108 to generate instructions to extract data based on a particular user's sharing settings reflected in that user's associated software contract 110. Such instructions can be transmitted to a data virtualization system 111, for example, so that the data virtualization system 111 can retrieve relevant data from a data platform 112 or via one or more third party services where the relevant data is stored.

In some embodiments, data transfer or transaction information regarding what data is accessed or transferred by the various systems can be transmitted to the agent 106 by a data virtualization system 111 or a data platform 112. For example, the data virtualization system 111 or data platform 112 may retrieve/access or modify user data it receives from one or more third party services (e.g., social networks, file storage services, or the like) or the data platform, and such retrieval/access and modification of information can be tracked and monitored. The retrieval/access and modification information can also be summarized and described and then sent to an agent 106 for any further processing and storing on a distributed ledger 108. This information can be used to track or monitor who accesses what type of data and when, for example.

In an implementation, the agent 106 (or one or more aspects of the agent 106) can include, or be implemented in, a "virtual computing environment." As used herein, the term "virtual computing environment" should be construed broadly to include, for example, computer readable program instructions executed by one or more processors (e.g., as described below in the example of FIG. 8) to implement one or more aspects of the modules or functionality described herein. Further, in this implementation, one or more modules or engines of the agent 106 may be understood as comprising one or more rules engines of the virtual computing environment that, in response to inputs received by the virtual computing environment, execute rules or other program instructions to modify operation of the virtual computing environment. For example, a request received from the user device(s) 102 may be understood as modifying operation of the virtual computing environment to cause the agent 106 to generate a software contract 110, public or private keys, or to perform other operations. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the agent 106 from a data platform 112, for example. Initial operation of the virtual computing environment may be understood as an establishment of the virtual computing environment. In some implementations, the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Distributed Ledger

The distributed ledger 108 can be a part of the agent 106 or a separate system. The distributed ledger 108 can be configured to store one or more software contracts 110, a plurality of private and public keys, data transfer or transaction information regarding what data is accessed or transferred by the various systems, and/or any other relevant information (e.g., what time the data is accessed, what account is associated with the accessing, who the accessed data belongs to, whether the appropriate permissions to access the data were appropriate, which public or private key were used to access the data, or the like).

A distributed ledger in conjunction with software contract support can provide a permissionless, trustless, censorship resistant, and immutable ledger that can be configured to track a state of account balances and facilitates the transition of a software contract 110 from one valid state to another. A combination of the software contracts 110 (e.g., smart contracts, Ethereum smart contracts, Turing complete smart contracts, or the like), and the key cryptography can provide a solution that can scale to include the most prolific of data sets. The systems and methods described herein can provide a user-friendly way to maintain access to, and/or control of, a user's user data.

In some embodiments, data transfer or transaction information regarding what data is accessed or transferred by the various systems can be stored in the distributed ledger 108. For example, the data virtualization system 111 may retrieve/access or modify user data it receives from one or more third party services (e.g., social networks, file storage services, or the like) or the data platform 112, and such retrieval/access and modification information can be tracked and monitored. The retrieval/access and modification information can also be summarized and described and then sent to an agent 106 for any further processing and storing on the distributed ledger 108. This data transfer or transaction information can be used to track or monitor who accesses what type of user data and when, for example.

Although there may be inefficiencies (e.g., slower writing to various blocks of a blockchain) with certain implementations of a distributed ledger in the state of the art, the technology improves quickly and soon the inefficiencies will be minimal or nonexistent as it compares to a traditional database, or distributed database. Therefore, it should be appreciated that although embodiments and examples herein disclose a data platform 112 that is used to process and store user data, a distributed ledger 108 can be used to store such user data in conjunction with a data platform 112, or in place of a data platform 112.

In some embodiments, a private blockchain or distributed ledger can be implemented. Private distributed ledgers can be useful when building secure services between enterprises that guarantee integrity. For example, a stock settlement service between three companies could use a private distributed ledger so the three companies have access to the same information and do not have to trust each other. Alternatively, banks could have a private distributed ledger for more secure and faster transfers of payments. When building a decentralized consumer-facing product, one goal can be to build a system where the user does not have to trust the service provider. The end user should be able to see who access their data and how often. The user should have the ability to synchronize a light or full node, and verify the transactions for themselves. When transacting with another address, the user should be able to see their transaction history and make a determination for themselves as to whether or not they would to trust a certain address.

Software Contracts

In some embodiments, a software contract 110 is a self-executing contract with the terms of the agreement between two parties being directly written into lines of code. The code and the agreements contained therein exist across a distributed, decentralized distributed ledger network. For example, software contracts 110 can permit trusted transactions and agreements to be carried out among disparate, anonymous parties without the need for a central authority, legal system, or external enforcement mechanism. They render transactions traceable, transparent, and irreversible. While a standard contract outlines the terms of a relationship (usually one enforceable by law), a software contract 110 enforces a relationship with cryptographic code. For example, software contracts 110 are programs that execute exactly as they are programmed.

In some embodiments, users, through their respective user devices 102, can update the user's personal privacy settings. Once an update is received/accessed, the agent 106 would then prepare a new software contract 110 and save it to the distributed ledger 108. It should be appreciated that, based on the technology of the distributed ledger (e.g., Blockchain, or the like), many old versions of user's software contracts may be present and viewable/accessible in various locations (e.g., blocks of the blockchain). Thus, it is desirable for the agent 106 to be able to distinguish which software contract 110 is the most up-to-date version. For example, the agent 106 can process the software contract 110 with an alphanumeric identifier indicating a version of the software contract 110 that is being saved. In another example, a date can be included with each software contract 110. In another example, each software contract 110 can include a reference to prior software contracts, so that upon review of all software contracts, certain locations on the distributed ledger 108 would not be reviewed or analyzed (e.g., older blocks would not need to be searched either based on the reference included or because a software contract is found in a newer block and would inherently be more up-to-date).

In some embodiments, a software contract 110 can be used and the software contract 110 can include a computer protocol intended to digitally facilitate, verify, or enforce the negotiation or performance of an agreement. A software contract 110 can allow the performance of credible transactions without third parties that can be trackable and irreversible. Many kinds of contractual clauses may be made partially or fully self-executing, self-enforcing, or both. Software contracts 110 can provide security that is superior to traditional contract law and to reduce other transaction costs associated with contracting. One example of a software contract 110 is a smart contract. An example of pseudocode in the Solidity programming language for a smart contract 110 is provided below:

```
pragma solidity ^0.4.18;
contract SmartContract {
  struct UserData {
    string URI;
    string metadata;
    string hash;
  }
  struct AcceptedBuyer {
    address acceptedBuyer;
    string key;
  }
  // List of addresses belonging to users who opted in to share their data
  address[ ] userAddresses;
  // List of structs containing the entities the user has agreed to share
  // their data with, alongside a decryption key that only that entity can
  access mapping(address => AcceptedBuyer[ ]) acceptedBuyers;
  // List of entities who want to get access to the user's data but have
  // not been granted permission by the user yet
  mapping(address => address[ ]) pendingBuyers;
  // List of structs pointing to a URI where the encrypted data is stored
  // along with some metadata the user is willing to publicize; the
  // metadata can be used by the entities to find out which user's data
  // they'd like to access
  mapping(address => UserData[ ]) userData;
}
```

The following example flows illustrate how a database can function with encrypted data based on privacy settings set by a user. The example flows help show some advantageous of the systems as they are used and operated. It should be appreciated that other flows not mentioned explicitly can be generated or exist based on the disclosure set forth herein.

With respect to encryption keys, an example flow can include the following. In this example, the smart contract acts as a small database that is continually updated every time the user adds or removes a list of authorized parties who will have access to the user data. For example, a user's private key can be securely transferred to a corresponding user device (e.g., 102) after an authentication process. Then a third party can request access to a user's environment data via a distributed ledger transaction. The user can deny or grant access to their environment data for free, or for a price. For example, the user can request a flat upfront fee, a subscription to the user's environment data, or a bidding platform for the user's environment data can be introduced. Now, for example, assume the user permits access to the user's environment data, and the third party makes the appropriate payment or agreement. When the user generates new environment data through use of a spatial computing device, the spatial computing device stores the encrypted data (e.g., in the encrypted data database 116) to a data platform (e.g., 112), and updates the state of a software contract 110 to indicate the new data has been generated or stored. Then when a third party queries the software contract 110 to retrieve a decryption key and a list of file locations of where to retrieve the user's environment data from. The user can later remove third parties from the software contract (e.g., by creating a new software contract to replace the old software contract, or the like) to remove access to the user's environment data.

Additionally, in another example flow, even though there may be sensor data stored on a data platform (e.g., 112), the operator of the data platform will not be able to decrypt the data because the operator will not have access to the necessary key(s). For example, an asymmetric private key can be generated for a user and can be securely transferred to the user's spatial computing device. An ephemeral symmetric file encryption key can also be generated. A user's sensor data (e.g., environment data, or other user data) generated by the spatial computing device is encrypted using the ephemeral symmetric file and a hash of the user's sensor data is computed as well. The encrypted sensor data is stored on a data platform (e.g., operated by the seller of the spatial computing device, for example) and a uniform resource identifier (URI) is retrieved. The spatial computing device queries a software contract on a distributed ledger to retrieve a list of all the pending third parties interested in the sensor data.

In some embodiments, the spatial computing device can periodically synchronize a light node of the distributed ledger to the user device 102. A light node, or lightweight node, may not download the complete distributed ledger. Instead, the light node downloads the block headers only to validate the authenticity of the transactions. Light nodes are easy to maintain and run on a system. The user selects which third parties the user would like to grant permission to their sensor data. In exchange for granting permission, an immediate transfer of funds, points, credit, or the like, or a subscription model between the third party and the user can take place on the distribute ledger. For the third party, the spatial computing device encrypts the symmetric file encryption key using provided public keys. All of the encrypted keys, along with the third party addresses are stored for accepted third parties. The user adds the URI, hash of the sensor data, and some metadata to the software contract. This set of steps can be repeated each time more sensor data is generated. All of the accepted third parties can query the software contract, use their private key to retrieve the ephemeral symmetric file encryption key, then download the sensor data and decrypt it. Anytime the user wants to change who has access to their sensor data, the user simply updates the user's privacy settings. An update to the user's privacy settings would trigger the user device to recompute the ephemeral symmetric file encryption key and omit the other party's public key when updating the software contract. The selected parties can have access to previously generated data, but may not have access to any newly generated sensor data. In addition, ephemeral symmetric file encryption key can be recomputed periodically or on a per file basis for added security. In some embodiments, any modifications to the software contract corresponding to the user's address must be signed by the asymmetric private key.

In some embodiments, a blockchain is used as a distributed ledger. The cost of blockchain transactions are based on the software contract platform selected. For example, if the Ethereum platform is selected and implemented, then transaction times and cost depend widely based on the network usage and the state of the final software or smart contract. Costs can be associated with publishing a software contract, a third party making a request to get access to user's data, a user updating list of accepted third parties, and a user adding metadata for new user data, for example. In some embodiments, the user updating a list of accepted third parties and the user adding metadata for new user data can be batched, so that the software contract is updated less frequently but at a much lower cost to the user. Additionally, Ethereum is also looking into ways via the software contract so that a transaction can be paid on the user's behalf, which would be desirable to implement in the systems and methods described. This could provide a way to help onboard new users until the users have made some money or points with permitting access to their data and can support further transactions for themselves. Also, EOS is another type of software contract platform that uses a different consensus mechanism called delegated proof-of-stake. At the cost of lower security and integrity, all transactions will be free to everyone, and costs can be avoided completely and can be a useful alternative to other smart contract platforms.

Example Data Platform

A data platform 112 can comprise a de-identified and pseudonymised data database 114, an encrypted data database 116, and a data verification system 118, for example. The data platform 112 can also be used to process and store data. For example, the data platform 112 can store user data, or environment data, that comprises data that a user device 102 collects about the user device's 102 environment (e.g., surrounding information about the room or area, comprising people's faces, room size, artwork, or anything that would be around a person in a private or public space). In some embodiments, the data platform 112 can also store a plurality of private and public keys, data transfer or transaction information regarding what data is accessed or transferred by the various systems, or any other relevant information (e.g., what time the data is accessed, what account is associated with the accessing, who the accessed data belongs to, whether the appropriate permissions to access the data were appropriate, which public or private key were used to access the data, or the like). In some embodiments, some data is stored temporarily until it is transmitted to an agent 106 for storage on a distributed ledger 108. In some embodiments, portions of data are stored in the data platform 112 and other portions are stored in the distributed ledger 108. Yet, in some embodiments, data can be stored in both systems as a form of redundancy or efficiency.

The type of user data generated on spatial computing devices can be highly personal and, in some cases, confidential, proprietary, or sensitive. Such user data can be used to build a model of a user's environment to enable content persistence and shared experiences. To do so involves: an object recognizer pipeline to detect and semantically label real objects in the user's surroundings; a world reconstruction pipeline that builds dense meshes for occlusion and collision detection; a map merge pipeline to guarantee that users in the same space operate in the same coordinate frame; and an ability to pin and restore virtual content that was created or shared with the user. For example, a single user's session may generate hundreds of megabytes of user data to make all of the above possible. It is desired that this user data be saved in a secured manner, but also available to the user, the provider of the spatial computing devices, and certain third parties, in order to create engaging and immersive experiences. An example flow for collecting such data without the use of a distributed ledger follows:

1. User captures raw sensor data with a spatial computing device;
2. User encrypts data on the spatial computing device;
3. User saves encrypted data to cloud storage (e.g., to a data platform) owned by a spatial computing company that provides the spatial computing device;
4. Spatial computing company maintains a copy of the user's key which was stored on the device during the manufacturing process;
5. Spatial computing company decrypts the user's data to build a model of the user's environment; and
6. Spatial computing company decrypts and shares the user's data with 3rd parties.

The systems and methods described herein provide a solution that will give a user personalized control of who has access to the user's user data, what portions of the user data are available to access, what portions of the user data are available to who, a platform on which the user can benefit from providing access to their user data, and a mechanism to guarantee the integrity of the user's user data. For example, a user has the option to grant a third party access to the user's user data without ever having the spatial computing company be able to decrypt the data themselves. In the constantly changing area of global consumer data privacy laws, an implementation that limits the spatial computing company's access to sensitive data is advantageous in the event of breaches or noncompliance with such privacy laws.

Example De-Identified and Pseudonymised Data Database

The de-identified and pseudonymised data database 114 can include user data, or environment data, that has been processed to remove any reference or indication of the origin of the data. For example, an entity that accesses such information stored on the de-identified and pseudonymised data database 114 would not be able to reverse-engineer the person/user or people/users associated with the data. It should be appreciated that in some circumstances (e.g., small datasets, or the like) entities may be able to statistically narrow down likely users based on certain factors and based on the entities' own proprietary information or other publically accessible information. However, the data itself should not indicate who the data belongs to on its own. For example, a company may access de-identified and pseudonymised data from the de-identified and pseudonymised data database 114 for any users that use a user device 102 in Butte, Montana, which may provide results for 10 people. The company can then determine within a certain threshold who some of the 10 people may be, either based on the results alone, or with additional proprietary or publically available data. However, the data de-identified and pseudonymised data itself would not provide such an indication and it is desired that any reverse-engineering, especially based on the results alone, is limited as much as possible. Therefore, it is important that algorithms that de-identify and pseudonymise data is proven to be tested and implemented properly, and that the de-identified and pseudonymised data is verified in some embodiments before provided to third parties.

In some embodiments, when the data virtualization system 111 requests data from the data platform 112, the data platform 112 can access the de-identified and pseudonymised data database 114 to locate relevant encrypted user data to transmit the de-identified and pseudonymised data to the data virtualization system 111. Data about the transaction can be recorded and information about the transaction can be transmitted to the agent 106 for processing and storage on the distributed ledger 108. Processing can include associating the transaction data with a particular user or user device 102 or location on the distributed ledger. Processing can also include formatting the data so that it saves properly in the distributed ledger 108 without any error and for optimized or efficient retrieval or review.

Example Encrypted Data Database

The encrypted data database 116 can store encrypted user data or environment data received from the user device(s) 102. In some embodiments, the data platform 112 can encrypt the data prior to storage. In some embodiments, the user device(s) 102 can encrypt the data (e.g., with a public or private encryption key) prior to transmitting to the data platform 112 for storage. In some implementations, it may be desired for the user device(s) 102 to encrypt the user device's 102 own data to increase overall system security in the case of a breach, for example. If a breach occurs and the data platform 112 is compromised, the encrypted data should be useless to any breachers because the encrypted data never arrives to the data platform 112 unencrypted and the key(s) necessary for decryption could be stored in a separate location (e.g., the distributed ledger 108 or the user device(s) 102).

In some embodiments, when the data virtualization system 111 requests data from the data platform 112, the data platform 112 can access the encrypted data database 116 to locate relevant encrypted user data to transmit the encrypted data to the data virtualization system 111. Data about the transaction can be recorded and information about the transaction can be transmitted to the agent 106 for processing and storage on the distributed ledger 108. Processing can include associating the transaction data with a particular user or user device 102 or location on the distributed ledger 108. Processing can also include formatting the data so that it saves properly in the distributed ledger 108 without any error and for optimized or efficient retrieval or review.

Example Data Verification System

The data verification system 118 can verify various information prior to transmission between the various systems. For example, and as described in more detail with respect to FIG. 3, the data verification system 118 can receive a private encryption key and software or smart contract criteria, or rules, as well as a confirmation that relevant encrypted user data is transmitted to a data virtualization system 111 (e.g., including information describing the time and type of transmission as well as a description of the user data, or any other information that may be relevant). The data verification system 118 can then verify that the encrypted user data and private encryption key match (e.g., by decrypting the data), and then transmit the verification results to an agent 106 to allow the agent to transmit the verified private encryption key to the data virtualization system 111 to decrypt the already received encrypted user data.

Example Data Virtualization System

The data virtualization system 111 can communicate with purchaser devices 104, a data platform 112, and an agent 106. The data virtualization system 111 can receive a request from a purchaser device 104 to access, request, or retrieve certain information or user data. For example, the data virtualization system 111 can request user data from a data platform 112, and if permitted, receive the requested user data (e.g., encrypted user data). In some embodiments, instructions on how to extract data or what data to extract (e.g., based on the terms of a software contract), can be transmitted to the data virtualization system 111 prior to the data virtualization system 111 sending a request to the data platform 112. In addition, for example, the data virtualization system 111 can receive private encryption key(s) associated with the user data of one or more user device(s), or users. The private encryption key(s) can be used to decrypt encrypted user data received from a data platform 112. Additionally, in some embodiments, data transaction information (e.g., information regarding the download, retrieval, access, or receipt of user relevant data from one or more third party services or the data platform, or the like) can be transmitted to the agent 106 for storage.

The data virtualization system 111 can comprise a user interface to facilitate interaction and manipulation of any user data by a purchaser device 104 that is received and decrypted by the data virtualization system 111. The data virtualization system 111 can also provide analytical tools that are configured to provide statistical results, charts, graphs, and models for a purchaser device 104 to interact with and manipulate. The data virtualization system 111 can also allow the download of the results of analysis. However, in some embodiments, and possibly based on user privacy settings dictated by a software contract 110, for example, the data virtualization system 111 can block the download or transmission of decrypted user data and limit the use of the decrypted user data to only the active purchaser device 104 session. Upon termination of the session, the data will be deleted and a new private encryption key will be prepared to decrypt the user data to enhance security (e.g., so that the released private encryption key is no longer useful). This process is described in more detail with respect to FIGS. 3 and 4, for example.

Example User Device(s)

The user device(s) 102 can communicate with an agent 106 and a data platform, in some embodiments. For example, the user device(s) 102 can receive a public or private encryption key from an agent to encrypt any collected or generated user data, or environment data. The encrypted user data can be transmitted to a data platform for storage and at certain time intervals (e.g., in realtime as the data is generated, daily, hourly, or upon connection to a network, or at any other desired time or interval). In some embodiments, no key would be sent to the user device(s) 102, and collected or generated user data can be transmitted to the data platform 112 for encryption then storage. As discussed above and herein, in some implementations, it may be desired for the user device(s) 102 to encrypt the user device's 102 own data to increase overall system security in the case of a breach, for example. If a breach occurs and the data platform 112 is compromised, the encrypted data will should be useless to any breachers because it never arrives to the data platform 112 unencrypted and the key(s) necessary for decryption could be stored in a separate location (e.g., the distributed ledger 108 or the user device(s) 102).

A user associated with a user device 102 can also provide user privacy settings, or privacy settings. The user has control over the user's own user data, or environment data, generated by their device(s). The user also has control over what user data is accessible from other sources (e.g., (e.g., third parties, other devices, the user herself, or any other data available). For example, the user can indicate, via a web browser or other input method, the user's privacy settings, or privacy rules, associated with the user's user data. Privacy settings can indicate limits with respect to accessibility, sharing, or selling of user data. For example, privacy settings can indicate, but are not limited to the following: what types of purchasers can or cannot access or purchase the user data, limits on what type(s) data are accessible (e.g., environment data, third party data associated with the user, user provided data, or the like), limits on when data is accessible (e.g., (e.g., time of day, week, or month), limits on how often data is accessible, the purpose of the access, the type of access (e.g., the type of connection, or machine accessing), location of access (e.g., (e.g., country of origin of the purchaser system as determined via IP), permissions regarding external data sources (e.g., whether social media data can be imported to enrich the user data), or any other relevant factor. Privacy settings can also include a blacklist or whitelist, offering the user the capability of blocking or allowing access to particular persons, entities, companies, or the like by name or type. For example, a user can add all banks or associated companies to the blacklist to block all user data from being accessed by banks and associated companies. In some embodiments, user privacy settings, or privacy rules, can be updated at any time by the user. After a user updates the user's privacy settings, all future transactional events regarding the user's user data would be controlled by the newly updated privacy settings.

Example Purchaser Device(s)

Purchaser device(s) 104 can communicate with the data virtualization system 111. The purchaser device(s) 104 can be operated by, or associated with, a purchaser. The purchaser can use the purchaser device 104 to purchase, view, access, review, analyze or interact with available user data through the data virtualization system 111. It should be appreciated that any user data the purchaser can purchase or access is based at least in part on each user's privacy settings as programmed into each user's respective software contracts. In some embodiments, the software contracts can also stipulate what type of purchaser should or should not have access to their data. For example, a particular user may forbid all banks or banking representatives from accessing their data because they may fear that it could impact their credit worthiness.

In some embodiments, the data virtualization system 111 can comprise a user interface to facilitate interaction and manipulation of any user data by a purchaser device 104 that is received and decrypted by the data virtualization system 111. The data virtualization system 111 can also provide analytical tools that are configured to provide statistical results, charts, graphs, and models for a purchaser device 104 to interact with and manipulate. The data virtualization system 111 can also allow the download of the results of analysis. However, in some embodiments, and possibly based on user privacy settings dictated by a software contract 110, for example, the data virtualization system 111 can block the download or transmission of decrypted user data and limit the use of the decrypted user data (e.g., use is limited to only the active purchaser device 104 session, or certain analytical tools may be blocked or limited, or the like). For example, upon termination of a active purchaser device 104 session, the data will be deleted and a new private encryption key will be prepared to decrypt the user data to enhance security (e.g., so that the released private encryption key is no longer useful). This process is described in more detail with respect to FIGS. 3 and 4, for example.

The user devices 102 or the purchaser devices 104 may include an augmented, mixed, or virtual reality display device such as, e.g., the wearable display system 1000 described with reference to FIG. 7A or the devices 702a-702c described with reference to FIG. 7B, or the user devices 824 described with reference to FIG. 8.

Description of an Example Data Flow Between the Various Systems

FIGS. 2-6 show flow diagrams of various methods for receiving and implementing user privacy settings associated with user data or environment data across various systems and components. Although an order is depicted in FIGS. 2-6, it should be appreciated that data can flow back and forth between the various systems, in any order, and in any direction or combination. For example, certain capabilities of one system can be implemented on another system or set of systems. In addition, for example, one system can be comprised of a number of systems.

Example Processing of User Privacy Settings

Figure 2A:
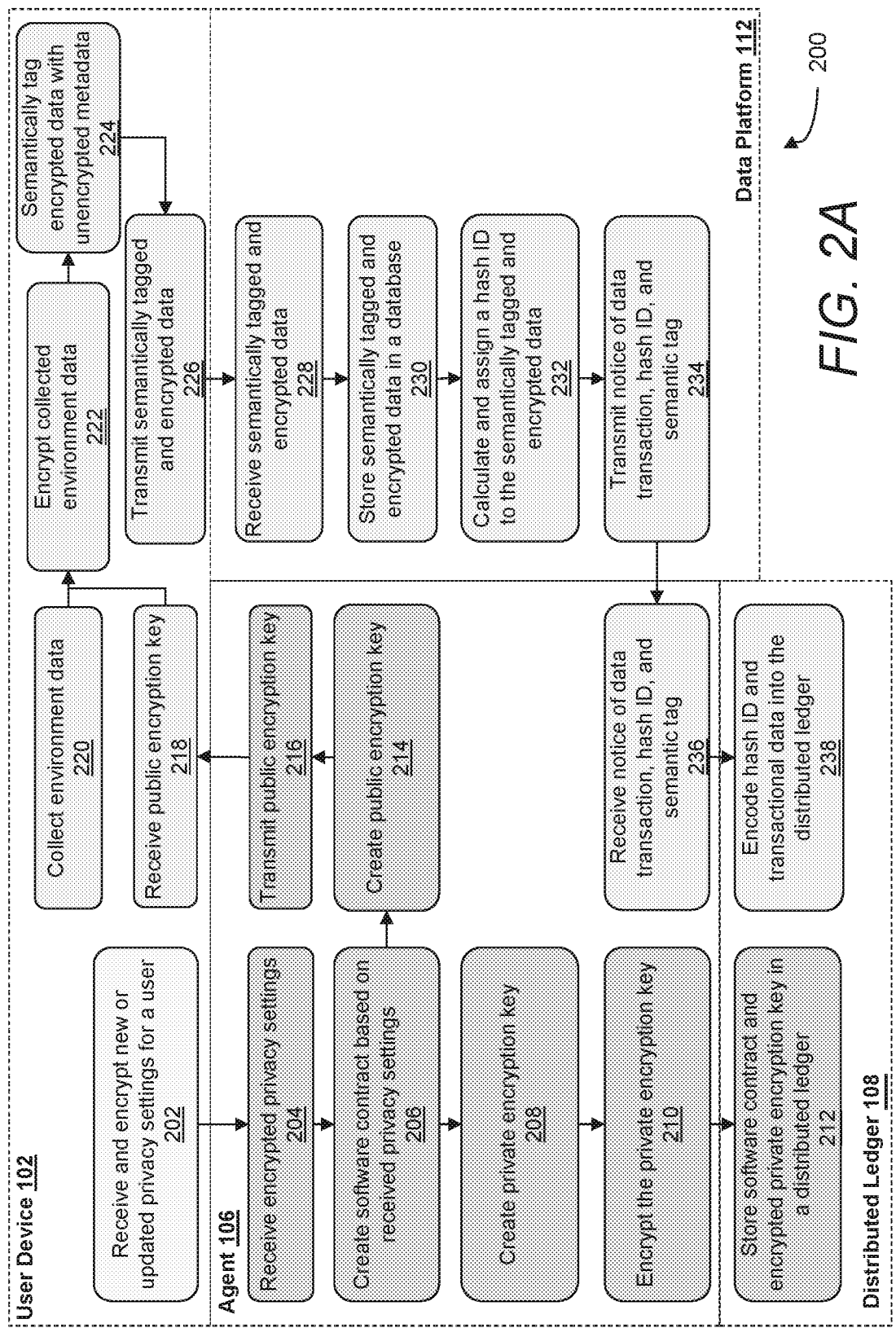
FIG. 2A shows a flow diagram of an example method for creating or updating privacy settings for a user.

FIG. 2A shows a flow diagram of an example method 200 for creating or updating privacy settings for a user.

In block 202, a user device 102 receives privacy settings associated with a user. The user device 102 can encrypt the new or updated privacy settings. The privacy settings can include new settings or updates to previously received settings.

In block 204, the agent 106 receives the new or updated privacy settings, and if necessary, decrypts the privacy settings. In block 206, the agent 106 creates a software contract (e.g., a smart contract, or the like) based on the received privacy settings.

In block 208, the agent 106 creates a private encryption key. In block 210, the agent 106, encrypts the private encryption key. For example, the private encryption key can be encrypted with the public encryption key.

In block 212, the agent 106 stores the software contract and the encrypted private encryption key in the distributed ledger 108. The agent 106 communicates with the distributed ledger 108 and acts as an intermediary between various devices. Due to limitations with certain distributed ledger technology, an agent may be a required component that is used to interact with and save to a distributed ledger. In some embodiments, the agent 106 may not be needed and the distributed ledger 108 itself may be able to fill the role of the agent 106.

In block 214, the agent 106 creates a public encryption key. Similar to all the blocks described with respect to FIGS. 2-6, although block 214 occurs after block 206, it should be appreciated that block 214 can occur immediately after block 204, prior to block 204 (e.g., when as user creates an account or connects to the agent 106 for the first time), after block 208, or in any order sufficient to accomplish the intended purpose of the systems and methods.

In block 216, the agent 106 transmits the public encryption key to the user device 102. In block 218, the user device 102 receives the public encryption key from the agent 106.

In block 220, the user device collects environment data, which is at least a portion of user data, and based on the surroundings of the user device 102, for example.

In block 222, the user device 102 encrypts the collected environment data, and any other user data, using the public encryption key. In block 224, the encrypted environment data is semantically tagged with metadata. In some embodiments, the metadata is unencrypted and contains no personally-identifiable information. For example, semantic annotation or tagging can include attaching additional information to the encrypted environment data so that computers and/or administrators reviewing the encrypted data may be able to ascertain information about the encrypted data (e.g., who's data it is, what user device is associated with the data, or the like). In some embodiments, the semantic tagging can be limited in scope as to further protect user privacy.

In block 226, the semantically tagged and encrypted data is transmitted electronically by an encrypted connection to a data platform 112. In some embodiments, the data platform 112 can be a data storage medium (e.g., a Data Lake, a NoSQL database, or the like). In some embodiments, the data platform 112 can be a series or set of data storage mediums. In some embodiments, the data platform 112 can include a data verification system (e.g., 118) and perform processing and verification for data that is transmitted to and from the data platform 112. In block 228, the data platform 112 receives the semantically tagged and encrypted data.

In block 230, the data platform 112 stores the semantically tagged and encrypted data. In some embodiments, in block 232, upon being stored, the semantically tagged and encrypted data is assigned hash identification (e.g., a minimum of 32 bytes). In some embodiments, the semantically tagged and encrypted data can be assigned another type of identification value or reference number.

In block 234, the data platform 112 transmits notice of the data transaction (e.g., the receipt and processing of the semantically tagged and encrypted data, or any other related information regarding the data transaction) to the agent 106. The data platform 112 also transmits the hash identification value (or any other identification value if a hash in not used), and the semantic tagging information. In block 236, the agent 106 receives the information and/or data.

In block 238, the agent 106 encodes the hash identification value and/or the transactional data into the distributed ledger 108. For example, the hash identification value and the transactional data can be stored with reference to, or with, a copy of the software contract and encrypted private encryption key that were stored in block 212. A benefit of keeping track of the relationship between the hash identification value, the transactional data, the software contract, and the private encryption key, is that a user can review the user's privacy settings and verify, based on the transactional data, that the privacy settings are working as intended, or if any changes should be made to the privacy settings, for example.

Figure 2B:
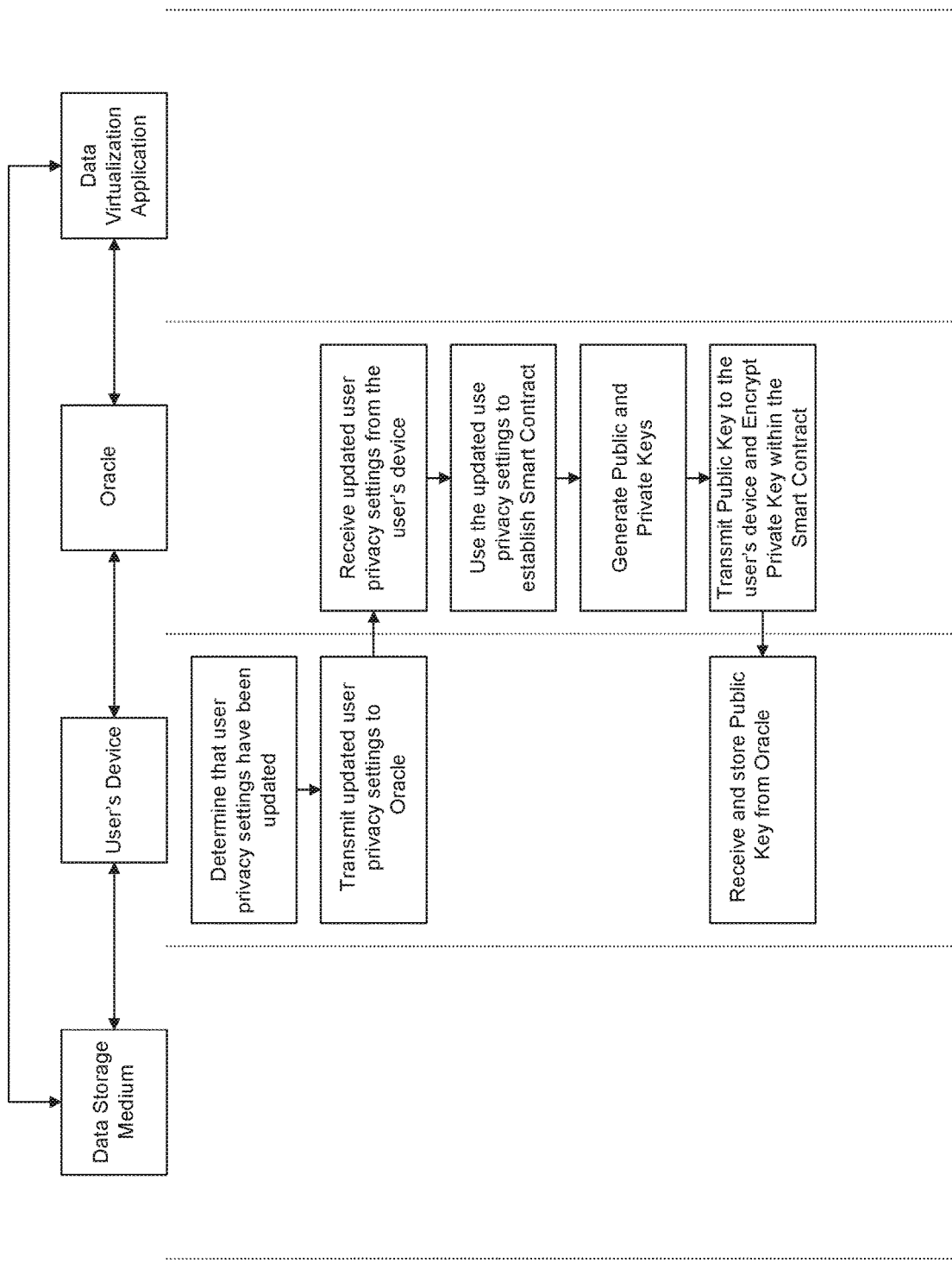
FIGS. 2B-2C show a swim-lane flow diagram of an example method for creating or updating privacy settings for a user.
Figure 2C:
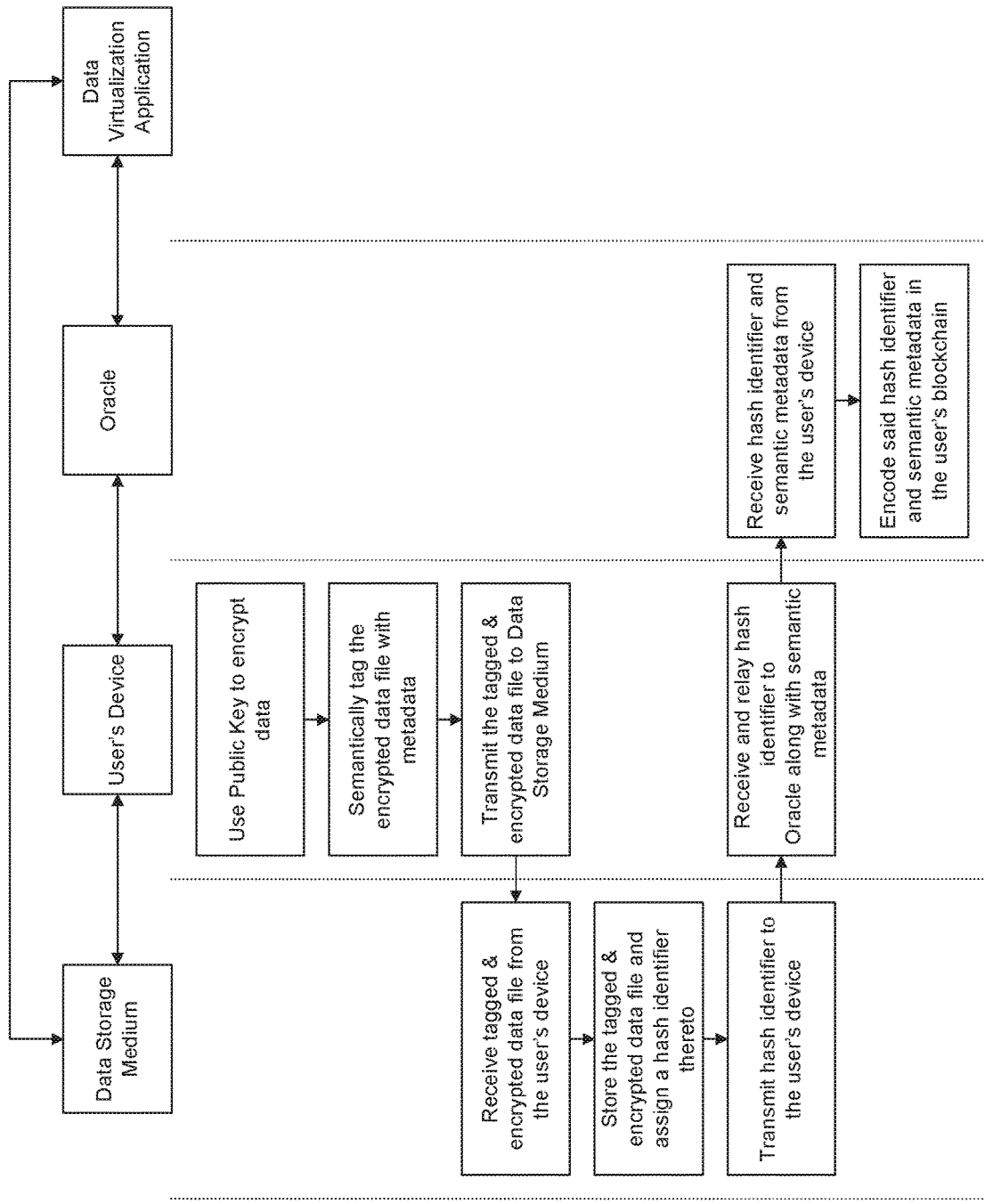

FIGS. 2B-2C show a swim-lane flow diagram of an example method for creating or updating privacy settings for a user. Similar to FIG. 2A, FIGS. 2B-2C show various steps performed by a data storage medium, a user's device, an oracle, and a data virtualization application.

Figure 3:
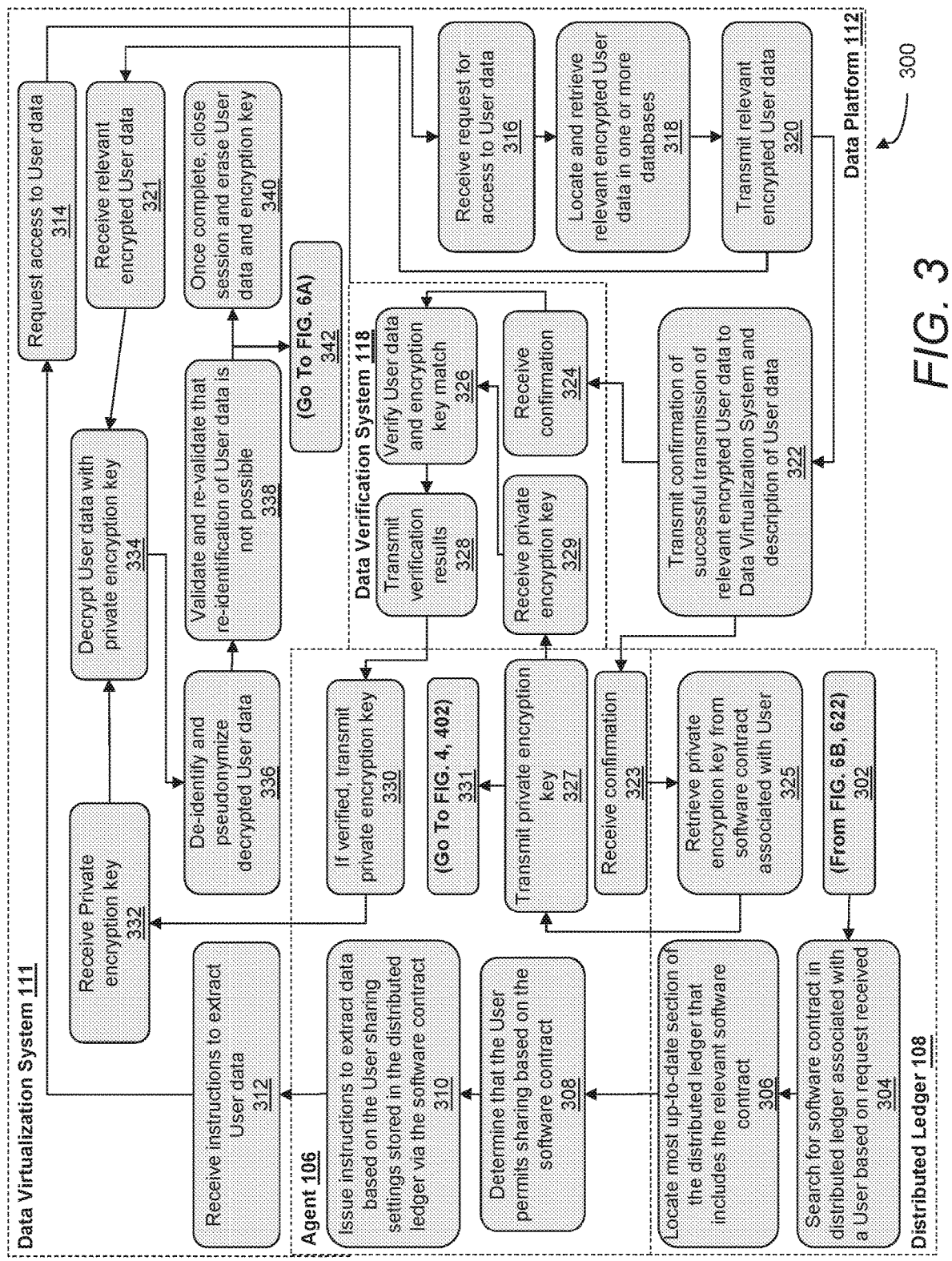
FIG. 3 shows a flow diagram of an example method for locating, transmitting, and decrypting user data. Certain additional or alternative blocks are depicted in FIGS. 4, 6A, and 6B.
Figure 4:
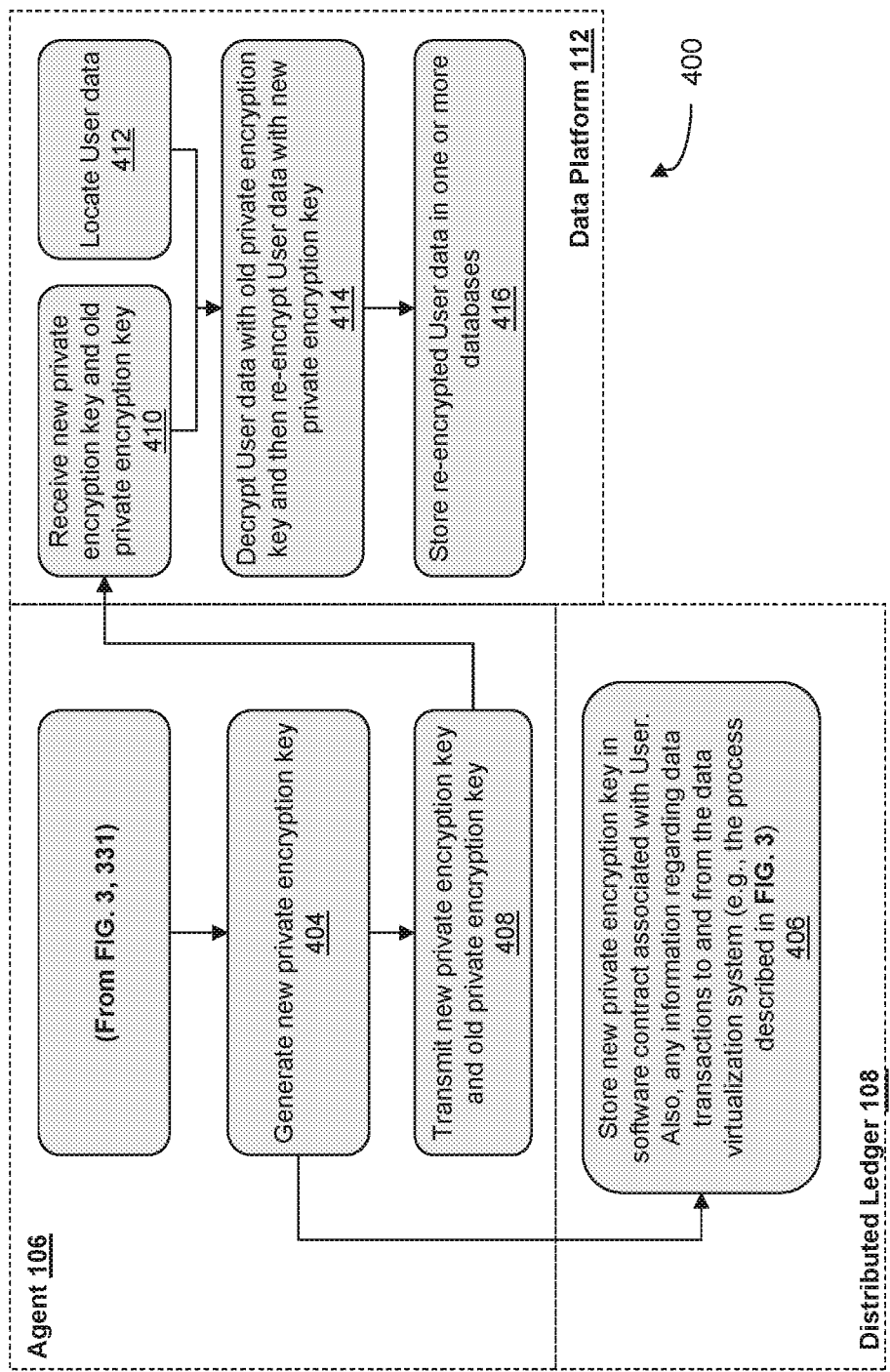
FIG. 4 shows a flow diagram of a method for generating a new private encryption key and re-encrypting user data with the new private encryption key. Certain additional or alternative steps are depicted in FIG. 3.
Figure 6A:
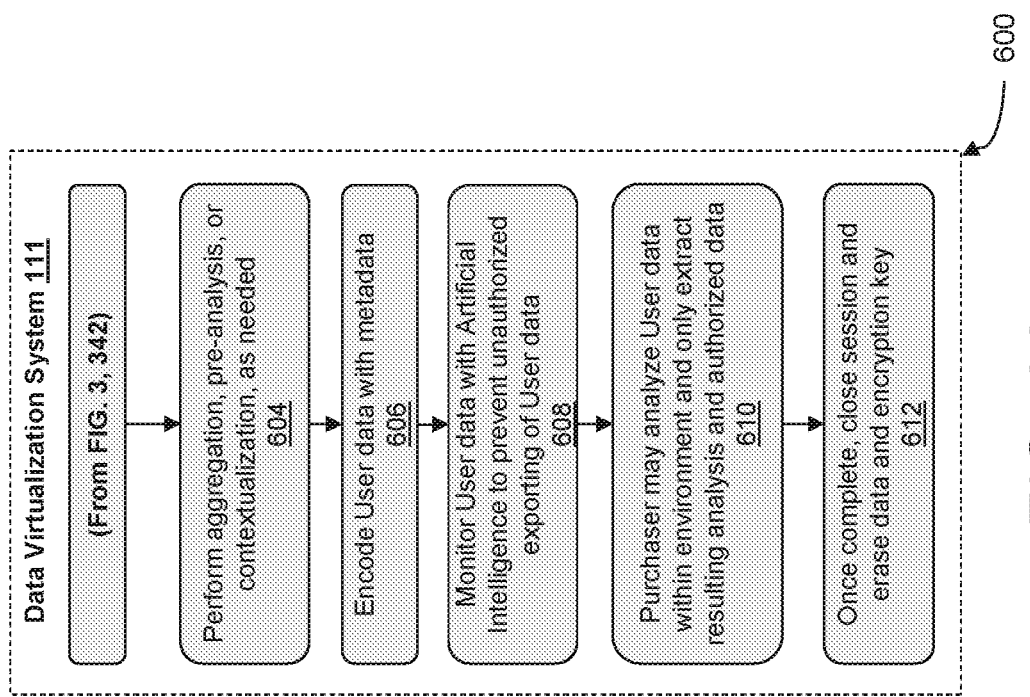
FIG. 6A shows a flow diagram of a method for validating, processing, and monitoring user data. Certain additional or alternative steps are depicted in FIG. 3.
Figure 6B:
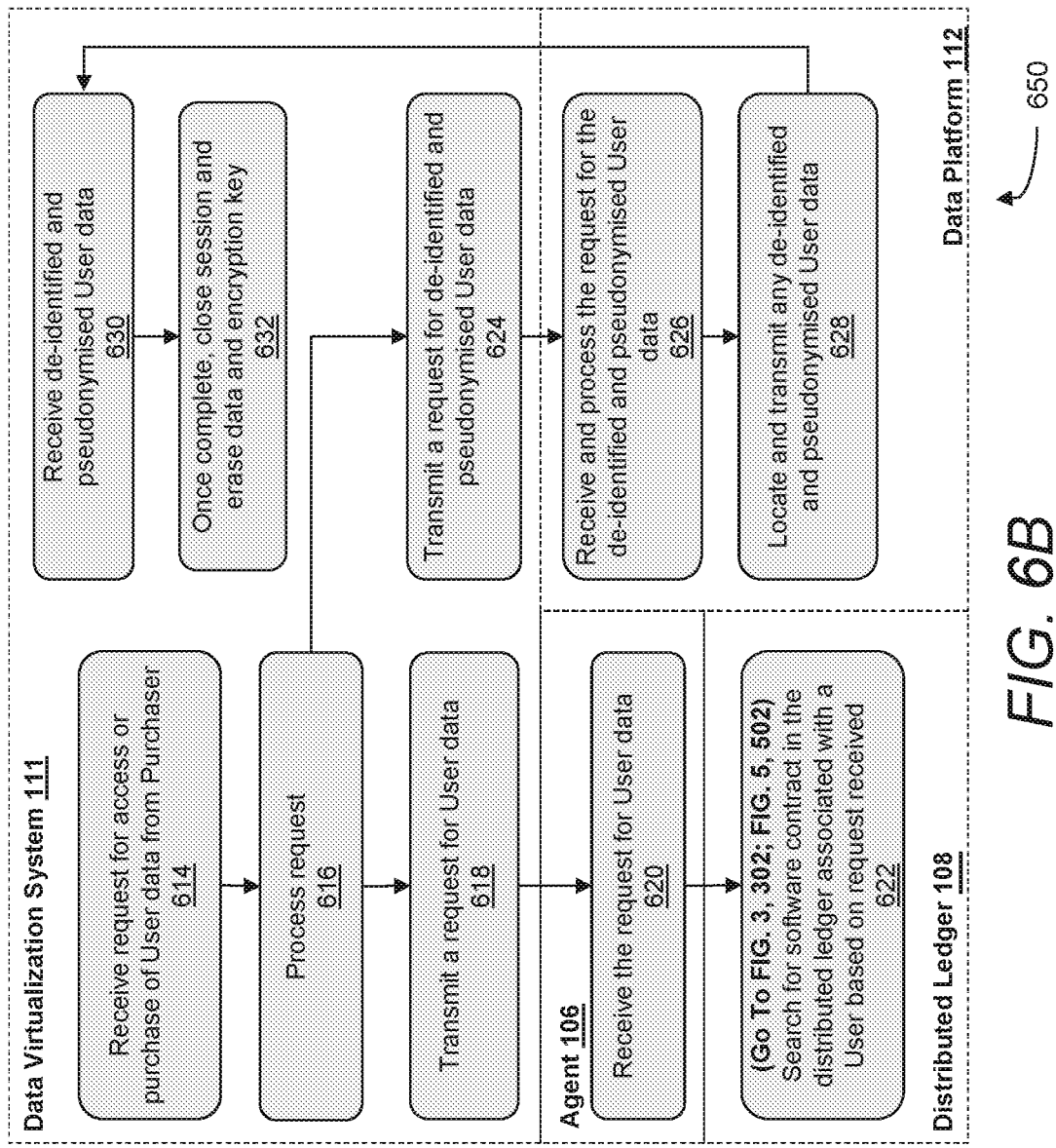
FIG. 6B shows a flow diagram of an example of a method for processing requests for de-identified and pseudonymised user data. Certain additional or alternative steps are depicted in FIGS. 3 and 5.

Example Locate, Verify, and Facilitate Transmission of User Data Based on Privacy Settings FIG. 3 shows a flow diagram of an example method for locating, transmitting, and decrypting user data. Certain additional or alternative blocks are depicted in FIGS. 4, 6A, and 6B, as indicated in the Figures.

In block 302, the agent 106 receives a request for user data, which can be associated with one or more users. More details about the request are described in relation to FIG. 6B, block 622.

In block 304, the agent 106 searches the distributed ledger 108, or distributed ledger, for a software contract associated with the one or more users. An example description of the creation of a software contract based on user privacy settings are provided with respect to FIGS. 2A-2C and herein.

In block 306, the agent 106 locates the most up-to-date section of the distributed ledger 108 that includes the relevant software contract. In some cases, for some users, there may only be one software contract associated with each of the users. In some cases, for other users, there may be two or more software contracts associated with each of the users. This is because, for example, in some distributed ledger technologies data can be stored in blocks. Once a block is written to the distributed ledger, the block cannot be altered or removed. Thus, any updates to a software contract must be written to a new block as a new software contract. If a user provides multiple updates to their privacy settings, then there will be multiple software contracts saved to multiple blocks of the distributed ledger. A benefit of having old versions of privacy settings stored in the distributed ledger allows a user (or other entities), either direct or indirectly, to view the history of changes to their privacy settings, as represented in corresponding software contracts. It is beneficial for the agent 106, when writing new software contracts for a particular user, to include a reference or indication of who the software contract is associated with and, in some cases, what version of, or when, the software contract was created. In some example, the agent 106 can rely on the transaction information (e.g., the date and time the block data was written to the particular block, or the date and time when the block was written to the distributed ledger) to determine which software contract is the most recent, if multiple software contracts exist for a particular user.

In block 308, the agent 106 determines which of the one or more users permit sharing of their user data based on each of their most up-to-date software contracts. For example, some users may not wish to share any information with the particular purchaser associated with the received request for user data, and the data associated with those users should not be shared or made accessible. Only the user data that is requested, and the user permits to share, should be shared or made accessible to the purchaser associated with the request.

In block 310, the agent 106 issues instructions to a data virtualization system 111 to extract the user data that was requested and associated with users that permitted sharing. In block 312, the data virtualization system 111 receives the instructions from block 310.

In block 314, the data virtualization system 111 requests the user data from a data platform 112 based on the instructions received from the agent 106. In block 316, the data platform 112 receives the request for access to user data.

In block 318, the data platform 112 locates and retrieves relevant encrypted user data for the one or more users that permitted sharing in one or more databases. Additional details on how the data platform 112 interacts with user data are described in relation to FIGS. 2 and 4-6. In block 320, the data platform 112 transmits or makes available the relevant encrypted user data to the data virtualization system 111. In block 321, the data virtualization system receives or accesses the relevant encrypted user data from block 320.

In block 322, the data platform 112 transmits a confirmation to a data verification system 118 and the agent 106 that the relevant encrypted user data was successfully transmitted to, or received by, the data virtualization system 111 in blocks 320, 321. In block 323, the agent receives the confirmation, and in block 324, the data verification system 118 receives the confirmation.

In block 325, the agent 106 retrieves or accesses private encryption keys from the software contracts associated with the one or more users that permitted sharing. In block 327, the private encryption keys are transmitted to the data verification system 118, and in block 331, the agent performs additional steps described in FIG. 4, starting in block 402. In block 329, the data verification system 118 receives the private encryption keys.

In block 326, the data verification system 118 verifies that the user data and private encryption keys match by decrypting the user data associated with each key successfully, for example.

In block 328, based on whether the user data was decrypted successfully or not, the data verification system 118 transmits verification results to the agent 106. In some embodiments, if multiple user's user data are to be verified and only a portion are successful and the remaining portion are unsuccessful (e.g., the private encryption key could not properly decrypt the data for a portion of users), the entire results can be transmitted to the agent 106 for processing.

In block 330, the agent 106 receives the verification results. In some embodiments, if some of the private encryption keys were successfully verified and others were not, then the portion that were successful can be transmitted to the data virtualization system 111. In some embodiments, if some of the private encryption keys were successfully verified and others were not, then nothing is transmitted to the data virtualization system 111 and the agent 106 repeats the process in blocks 325-328 with other potential private encryption keys until verification is successful and then transmits all relevant and verified private encryption keys together. It may be desired to transmit all private encryption keys together or prompt a purchaser using the data virtualization system 111 that not all data is available prior to presenting anything in case the purchaser wishes to adjust or cancel the request. In some embodiments, if some of the private encryption keys were successfully verified by the data verification system 118 in block 326 and others were not, then the successful portion can be transmitted to the data virtualization system and the processes in blocks 325, 327, 329, 326, and 328 can be repeated for the unsuccessful portion until the correct private encryption keys are located and then transmit to the data virtualization system 111.

It may be desired to transmit any private encryption keys once verified to the data virtualization system 111, and any additional verified private encryption keys later, once verified, so that a purchaser using the data virtualization system 111 is not delayed and can review the data more quickly, with the data being enriched as additional new private encryption keys are received or accessed from block 330, in block 332. In some embodiments, if the private encryption keys cannot be verified after a certain number of attempts (e.g., 1, 2, 3, etc.) by the data verification system 118, then a final error can be output to the agent 106, and then output to the data virtualization system 111 related to that particular user data associated with the private encryption key that cannot be verified. In block 332, the data virtualization system 111, receives or accesses the verified private encryption keys.

In block 334, based on the relevant encrypted user data from block 321 and the matching and verified private encryption keys received from block 332, the data virtualization system 111 can decrypt the encrypted user data with the private encryption keys received or access from the agent 106 in block 332, using the associated private encryption key for each set of encrypted user data received from the data platform.

In block 336, the data virtualization system 111 de-identifies and pseudonymizes the decrypted user data so that a purchaser using the data virtualization system 111 cannot identify the user the data is associated with. For example, pseudonomization is a data management and de-identification procedure by which personally identifiable information fields within a data record are replaced by one or more artificial identifiers, or pseudonyms. A single pseudonym for each replaced field or collection of replaced fields makes the data record less identifiable while remaining suitable for data analysis and data processing. In some embodiments, pseudonymized data can be restored to the data's original state with the addition of information, which then allows individuals to be re-identified, while anonymized data can never be restored to the data's original state. In some embodiments, where pseudonomization is not as effective as desired (e.g., with reference to block 338 and a preconfigured or automatic threshold), fragmentation or other methods of altering the user data can be used as well.

In block 338, the data virtualization system 111 runs tests to validate and re-validate that re-identification of any of the user data is not possible, or statistically not possible within a preconfigured or automatic threshold (e.g., 40%, 50%, 51%, 80%, 90%, 95%, 99% unlikely to associate the data with a particular person).

In block 340, once the data virtualization system 111 is closed down (e.g., upon receiving instructions to terminate from a purchaser), the data virtualization system 111 closes the session and erases any user data and private encryption keys it has received. Also, in block 342, FIG. 6A describes additional details on how a purchaser may interact with the data virtualization system 111 and how user data is further protected from being exported or taken out of the data virtualization system 111 in block 602.

Example Generation and Application of New Private Encryption Key to User Data

FIG. 4 shows a flow diagram of a method 400 for generating a new private encryption key and re-encrypting user data with the new private encryption key. Certain additional or alternative steps are depicted in FIG. 3. After a private encryption key has been transmitted to a data virtualization system 111 in block 330 in FIG. 3, block 331 in FIG. 3 can include the process starting in block 404.

In block 404, the agent 106 can generate new private encryption keys for any user data associated with the private encryption keys transmitted or made available in block 330 in FIG. 3 to a data virtualization system 111. It is desirable to generate a new private encryption key to re-encrypt user data associated with any distributed private encryption keys. For example, if a purchaser were to publish any of the private encryption keys it receives through the data virtualization system, the security and privacy of the user data can be compromised. Although in some embodiments, a purchaser would not have direct access to any private keys the data virtualization system 111 receives or accesses, generating a new private encryption key is still more secure in case the purchaser hacks the data virtualization system to retrieve the key without authorization, for example.

In block 406, the agent 106 stores the new private encryption keys in updated software contracts associated with the users whose data was shared or accessed in FIG. 3. Any information regarding the data transaction to and from the data virtualization system will be stored with the updated software contracts as well, in some embodiments. For example, the transmission details related to the transmission of private encryption keys in block 330 in FIG. 3 would be stored in the updated software contract.

In block 408, the agent 106 transmits or makes available the new private encryption keys and the old private encryption keys (e.g., the keys that were transmitted in block 330 in FIG. 3) to the data platform 112. In block 410, the data platform receives the new private encryption keys from the agent 106.

In block 412, the data platform 112 locates the user data associated with the private encryption keys it received in block 410. In block 414, the data platform 112 decrypts user data with the old private encryption keys and then re-encrypts the user data with the new private encryption keys. Then in block 416, the re-encrypted user data is stored in one or more databases.

Example of Enriching User Data with Third Party Data

Figure 5:
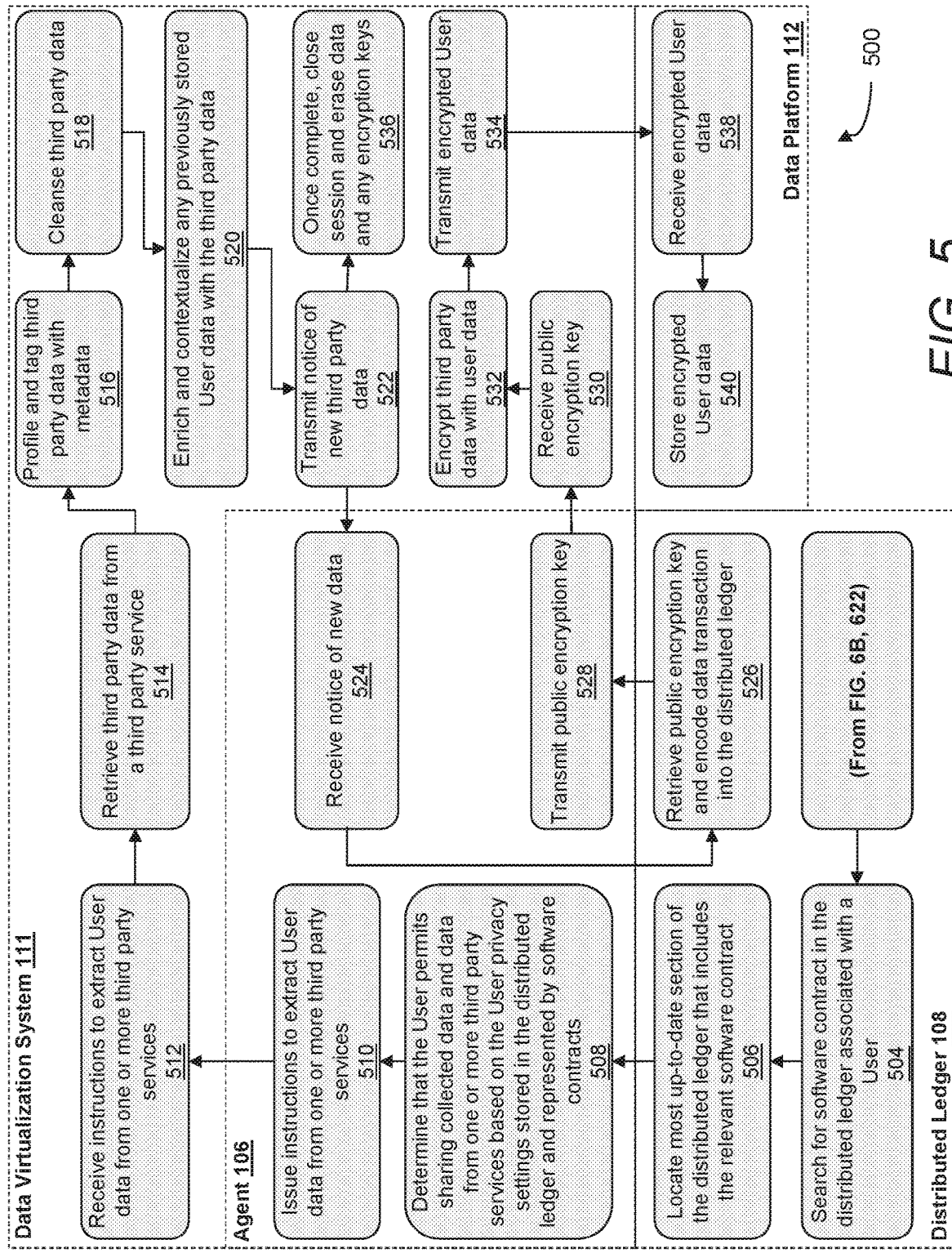
FIG. 5 shows a flow diagram of a method for enriching user data with retrieved social media data from one or more third party services. Certain additional or alternative steps are depicted in FIG. 6B.

FIG. 5 shows a flow diagram of a method 500 for enriching user data with retrieved or accessed third party data from one or more third party services. Certain additional or alternative steps are depicted in FIG. 6B. It should be appreciated that any third party data can be retrieved or accessed to enrich the user data. For example, third party data can include, financial data (e.g., from a credit bureau or credit rating service), social media data (e.g., Facebook, MySpace, LinkedIn, Instagram, Snapchat, etc.), personal data (e.g., uploaded to a file sharing site such as dropbox, box, google drive, Apple's iCloud, etc.), any viewing habits from video streaming services (e.g., Netflix, Amazon prime video, Hulu, etc.), content from electronic mail or chatting services (e.g., Gmail, Yahoo Mail, Google Hangouts, Zoom video, WhatsApp, Facebook Messenger, Outlook, etc.), or any other third party service that the user wishes to provide access to.

In block 504, which can initiate after the process from block 622 in FIG. 6B described herein, the agent 106 can search for one or more software contract in the distributed ledger 108 associated with a particular user or set of users based on a request for user data received from a data virtualization system 111 (see FIG. 6B for more information and detail regarding the request).

In block 506, the agent 106 can locate the most up-to-date section of the distributed ledger that includes the relevant software contracts for the one or more users. As described above, in some cases, for some users, there may only be one software contract associated with each of the users. In some cases, for other users, there may be two or more software contracts associated with each of the users. This is because, for example, in some distributed ledger technologies data can be stored in blocks. Once a block is written to the distributed ledger, the block cannot be altered or removed. Thus, any updates to a software contract must be written to a new block as a new software contract. If a user provides multiple updates to their privacy settings, then there will be multiple software contracts saved to multiple blocks of the distributed ledger. A benefit of having old versions of privacy settings stored in the distributed ledger allows a user (or other entities), either direct or indirectly, to view the history of changes to their privacy settings, as represented in corresponding software contracts. It is beneficial for the agent 106, when writing new software contracts for a particular user, to include a reference or indication of who the software contract is associated with and, in some cases, what version of, or when, the software contract was created. In some example, the agent 106 can rely on the transaction information (e.g., the date and time the block data was written to the particular block, or the date and time when the block was written to the distributed ledger) to determine which software contract is the most recent, if multiple software contracts exist for a particular user.

In block 508, the agent 106 determines that the one or more users permit sharing collected data and data from one or more third party services based on the user privacy settings stored in the distributed ledger and represented by software contracts.

In block 510, the agent 106 issues instructions to the data virtualization system 111 to extract user data that was requested and associated with users that permitted sharing from one or more third party services. The instructions can also include details regarding the software contracts and what types of data should be, and should not be, shared with a purchaser accessing the data virtualization system 111, and who initiated the request for data. In block 512, the data virtualization system 111 receives or accesses the instructions from block 510.

In block 514, the data virtualization system 111 retrieves or accesses third party data that is permitted from one of the one or more third party services. For example, retrieval can be performed through the use of API calls, or by any other means available.

In block 516, the data virtualization system 111 profiles and tags the third party data with metadata. In some embodiments, the metadata can describe where the third party data originated from, the user the third party data is associated with, the time the data was retrieved, or any other relevant information.

In block 518, the third party data can be cleansed and formatted. For example, in some embodiments, the data can be edited to remove any information that is not permitted to be shared based on the user privacy settings, or software contract. In some embodiments, extra or irrelevant information may be retrieved (e.g., through an API), and the data must be formatted to comply with the data virtualization system 111 requirements or display preferences of the purchaser or system.

In block 520, the data virtualization system 111 can enrich and contextualize any previously stored user data with the third party data. For example, data enrichment can mean merging third-party data from an external authoritative source with an existing database of first-party customer data. Also, for example, contextualization can be the process of identifying data relevant to an entity (e.g., a person or a city) based on the entity's contextual information. For instance, context or contextual information can be any information about any entity that can be used to effectively reduce the amount of reasoning required (via filtering, aggregation, and inference) for decision making within the scope of a specific application. Contextualization is then the process of identifying the data relevant to an entity based on the entity's contextual information. Contextualization can exclude irrelevant data from consideration and has the potential to reduce data from several aspects including volume, velocity, and variety in large-scale data intensive applications. A benefit of contextualization can include the potential to reduce the amount of data based on the interests from applications/services/users. In addition, another benefit of contextualization is that it can improve the scalability and efficiency of data process, query, and/or delivery by excluding irrelevant data.

In block 522, the data virtualization system 111 can transmit notice and transactional details of new third party data that has been retrieved in block 514 to the agent 106. In block 524, the agent 106 can receive the notice and transactional details of new third party data.

In block 526, the agent 106 can encode the data transaction information (e.g., data extraction, profiling & processing, encryption, etc.) into the distributed ledger 108. Additionally, in block 526, the agent 106 can retrieve a public encryption key associated with the user (or users) that third party data was retrieved for and, in block 528, transmit the public encryption key(s) to the data virtualization system 111. In block 530, the data virtualization system receives the public encryption key(s).

In block 532, the data virtualization system 111 encrypts third party data retrieved or accessed from the third party service in block 514, and in some embodiments, encrypts the third party data with any previously stored user data. The encryption in block 532 would occur after the processing has been performed to the third party data by the data virtualization system 111 in blocks 516, 518, and 520.

In block 534, the data virtualization system 111 transmits or makes available the encrypted user data to the data platform 112. In block 538, the data platform 112, receives or accesses the encrypted user data and, in block 540, stores the encrypted user data in one or more databases.

In block 536, once the data virtualization system 111 is closed down (e.g., upon receiving instructions to terminate from a purchaser), the data virtualization system 111 closes the session and erases any user data (including any third party data) and any private encryption keys the data virtualization system 111 has received. Also, FIGS. 6A and 6B describes additional details on how a purchaser may interact with the data virtualization system 111 and how user data is further protected from being exported or taken out of the data virtualization system 111 in block 602.

Further Validating, Processing, and Monitoring User Data

FIG. 6A shows a flow diagram of a method 600 for validating, processing, and monitoring user data. Certain additional or alternative steps are depicted in FIG. 3.

In block 604, which can initiate after the process in block 342 from FIG. 3, for example, the data virtualization system 111 performs aggregation, pre-analysis, and/or contextualization, to the user data. For example, aggregation can include an aggregate function or aggregation function, which is a function where the values of multiple rows of data can be grouped together to form a single summary value. Some common aggregate functions can include: average (i.e., arithmetic mean), count, maximum, median, minimum, mode, range, sum, nanmean (mean ignoring NaN values, also known as "nil" or "null"), or stddev. Pre-analysis, for example, can be configured to describe how a purchaser will analyze user data, which would be configured in advance of accessing any data. Then, in block 606, the data virtualization system 111 encodes user data with metadata as described above and herein.

In block 608, the data virtualization system 111 monitors the user data with machine learning or artificial intelligence (AI) to prevent unauthorized exporting of user data. In some embodiments, it is desirable to prevent unauthorized exporting of certain user data from the data virtualization system 111 to potentially increase the security and privacy of the user data. For example, if a purchaser were to take user data out of the system, the purchaser could then sell the data or publish it.

In some embodiments, machine learning can be used to monitor user data and purchaser interactions with the data virtualization system 111 to prevent unauthorized exporting of user data. For example, the data virtualization system 111 (or one or more other systems in other embodiments) can implement machine learning algorithms or AI to monitor user data and manipulation to user data to ensure that no user data, or portions of user data, are exported or copied out of the data virtualization system 111.

A number of different types of algorithms may be used by the data virtualization system 111 as well. For example, certain embodiments herein may use a logistical regression model. However, other models are possible, such as a linear regression model, a discrete choice model, or a generalized linear model. The machine learning algorithms can be configured to adaptively develop and update the models over time based on new input received by the data virtualization system 111. For example, the models can be regenerated on a periodic basis as new user information is received or retrieved by the data virtualization system 111 to help keep the predictions in the model more accurate as the user data is updated. The data virtualization system 111 is described in more detail herein.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of player interaction data may be analyzed to identify user preferences. These user preferences may be determined off-line using historical data. Further, the determined preferences may then be used in real-time to select a match plan (as described in more detail below) that may provide increased user enjoyment and consequently engagement compared to other matchmaking systems that do not use the techniques disclosed herein.

In block 610, a purchaser may analyze user data and any other statistical data within the data virtualization system's 111 virtual environment. The purchaser can extract resulting analysis and authorized data only. For example, some users may authorize the export of their respective user data, while other users may not authorize any export or some exporting capabilities (e.g., only a portion of a user's user data may be exportable and another portion may not be exportable).

In block 612, once the data virtualization system 111 is closed down (e.g., upon receiving instructions to terminate from a purchaser), the data virtualization system 111 closes the session and erases any user data and any private encryption keys the data virtualization system 111 has received.

Request for De-Identified and Pseudonymised User Data

FIG. 6B shows a flow diagram of an example of a method 650 for processing requests for de-identified and pseudonymised user data. Certain additional or alternative steps are depicted in FIGS. 3 and 5.

In block 614, the data virtualization system 111 receives a request for access or purchase of user data from a purchaser. The request can include a request for user data that requires a check with associated software contract(s) as well as any already processed and stored de-identified and pseudonymised user data. For example, in some embodiments, the systems (e.g., the data platform 112, agent 106, etc.) can de-identify or pseudonymise user data and store the processed data in the data platform 112. In some embodiments, the de-identified and pseudonymised user data can be checked and verified to ensure the user data is sufficiently de-identified and pseudonymised. In some embodiments, users must indicate in their privacy settings whether they would allow their data to be de-identified and pseudonymised, and/or provided to purchasers. In some embodiments, users may not need to make an indication, and instead some or all their data may be de-identified and pseudonymised and provided to purchasers. In some embodiments, the de-identified and pseudonymised user data only includes generic, statistical information about users as a whole. Certain filtering options may be available, via the data virtualization system 111, to refine views of the de-identified and pseudonymised user data.

In block 616, the data virtualization system 111 processes the request to determine which portions of the requested user data are available and authorized to be shared with the purchaser (e.g., the de-identified and pseudonymised user data) and which portions of the requested user data require additional approval from a user via privacy settings as represented and enforced by software contracts.

In block 618, for the portions of the requested user data that require additional approval from a user, the data virtualization system 111 transmits a request, or makes available a batch of requests, for user data to the agent 106. In block 620, the agent 106 receives the request(s) for user data.

In block 622, the agent 106 searches the distributed ledger 108, or distributed ledger, for one or more software contracts associated with one or more users based on the request received in block 614. An example description of the creation of a software contract based on user privacy settings are provided with respect to FIGS. 2A-2C and herein. Additional steps are discussed in relation to FIGS. 3 and 5. For example, there are steps that continue from block 622 starting in block 302 in FIG. 3 and in block 502 in FIG. 5.

In block 624, for the portions of the requested user data that do not require additional approval from a user and are available and authorized to be shared with the purchaser, the data virtualization system 111 transmits a request for de-identified and pseudonymised user data to the data platform 112. In block 626, the data platform 112 receives the request for de-identified and pseudonymised user data.

In block 628, the data platform 112 locates and transmits any de-identified and pseudonymised user data to the data virtualization system 111. In block 630, the data platform 112 received any de-identified and pseudonymised user data.

In block 632, once the data virtualization system 111 is closed down (e.g., upon receiving instructions to terminate from a purchaser), the data virtualization system 111 closes the session and erases any user data, including any de-identified and pseudonymised user data, and any private encryption keys the data virtualization system 111 has received.

Example Spatial Computing Device

A spatial computing device, or wearable display system such as a head mounted display (HMD) may be configured to work with a companion device such as a handheld, user-input device. The spatial computing device can include an outward-facing image capture device, such as a camera, which can image an environment of a user of the spatial computing device. The image capture device can be used to capture and obtain information or data (e.g., a key or secret) displayed on the companion device in order to establish shared information or data (e.g., a shared key, a shared secret, or a signing key) between the spatial computing device and the companion device. The shared data can in turn be used by the spatial computing device or the companion device to encrypt/decrypt data for/from a secure data transfer or data platform.

FIG. 7A illustrates an example of a spatial computing device or a wearable display system 1000 that can be used to present a virtual reality (VR), augmented reality (AR), or mixed reality (MR) experience to a display system wearer or viewer 1004. The wearable display system 1000 may be programmed to perform any of the applications or embodiments described herein. The display system 1000 includes a display 1008, and various mechanical and electronic modules and systems to support the functioning of the display 1008. The display 1008 may be coupled to a frame 1012, which is wearable by a display system user, wearer, or viewer 1004 and which is configured to position the display 1008 in front of the eyes of the wearer 1004. The display 1008 may be a light field display. In some embodiments, a speaker 1016 is coupled to the frame 1012 and positioned adjacent the ear canal of the user. In some embodiments, another speaker, not shown, is positioned adjacent the other ear canal of the user to provide for stereo/shapeable sound control. The display 1008 is operatively coupled 1020, such as by a wired lead or wireless connectivity, to a local data processing module 1024 which may be mounted in a variety of configurations, such as fixedly attached to the frame 1012, fixedly attached to a helmet or hat worn by the user, embedded in headphones, or otherwise removably attached to the user 1004 (e.g., in a backpack-style configuration, in a belt-coupling style configuration).

The frame 1012 can have one or more cameras attached or mounted to the frame 1012 to obtain images of the wearer's eye(s). In one embodiment, the camera(s) may be mounted to the frame 1012 in front of a wearer's eye so that the eye can be imaged directly. In other embodiments, the camera can be mounted along a stem of the frame 1012 (e.g., near the wearer's ear). In such embodiments, the display 1008 may be coated with a material that reflects light from the wearer's eye back toward the camera. The light may be infrared light, since iris features are prominent in infrared images.

The local processing and data module 1024 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 1012 or otherwise attached to the user 1004), such as image capture devices (such as cameras), microphones, inertial measurement units, accelerometers, compasses, GPS units, radio devices, or gyros; or (b) acquired or processed using remote processing module 1028 or remote data repository 1032, possibly for passage to the display 1008 after such processing or retrieval. The local processing and data module 1024 may be operatively coupled to the remote processing module 1028 and remote data repository 1032 by communication links 1036 or 1040, such as via wired or wireless communication links, such that these remote modules 1028, 1032 are available as resources to the local processing and data module 1024. The image capture device(s) can be used to capture the eye images used in the eye image processing procedures. In addition, the remote processing module 1028 and remote data repository 1032 may be operatively coupled to each other.

In some embodiments, the remote processing module 1028 may comprise one or more processors configured to analyze and process data or image information such as video information captured by an image capture device. The video data may be stored locally in the local processing and data module 1024 or in the remote data repository 1032. In some embodiments, the remote data repository 1032 may comprise a digital data storage facility, which may be available through the internet or other networking configuration in a "cloud" resource configuration. In some embodiments, all data is stored and all computations are performed in the local processing and data module 1024, allowing fully autonomous use from a remote module.

In some implementations, the local processing and data module 1024 or the remote processing module 1028 are programmed to perform embodiments of systems and methods as described herein. The image capture device can capture video for a particular application (e.g., video of the wearer's eye for an eye-tracking application or video of a wearer's hand or finger for a gesture identification application). The video can be analyzed by one or both of the processing modules 1024, 1028. In some cases, off-loading at least some of the iris code generation to a remote processing module (e.g., in the "cloud") may improve efficiency or speed of the computations. The parameters of the systems and methods disclosed herein can be stored in data modules 1024 or 1028.

The results of the analysis can be used by one or both of the processing modules 1024, 1028 for additional operations or processing. For example, in various applications, biometric identification, eye-tracking, recognition, or classification of gestures, objects, poses, etc. may be used by the wearable display system 1000. For example, the wearable display system 1000 may analyze video captured of a hand of the wearer 1004 and recognize a gesture by the wearer's hand (e.g., picking up a real or virtual object, signaling assent or dissent (e.g., "thumbs up", or "thumbs down"), etc.), and the wearable display system.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Another Example User Data Transaction System

Figure 7B:
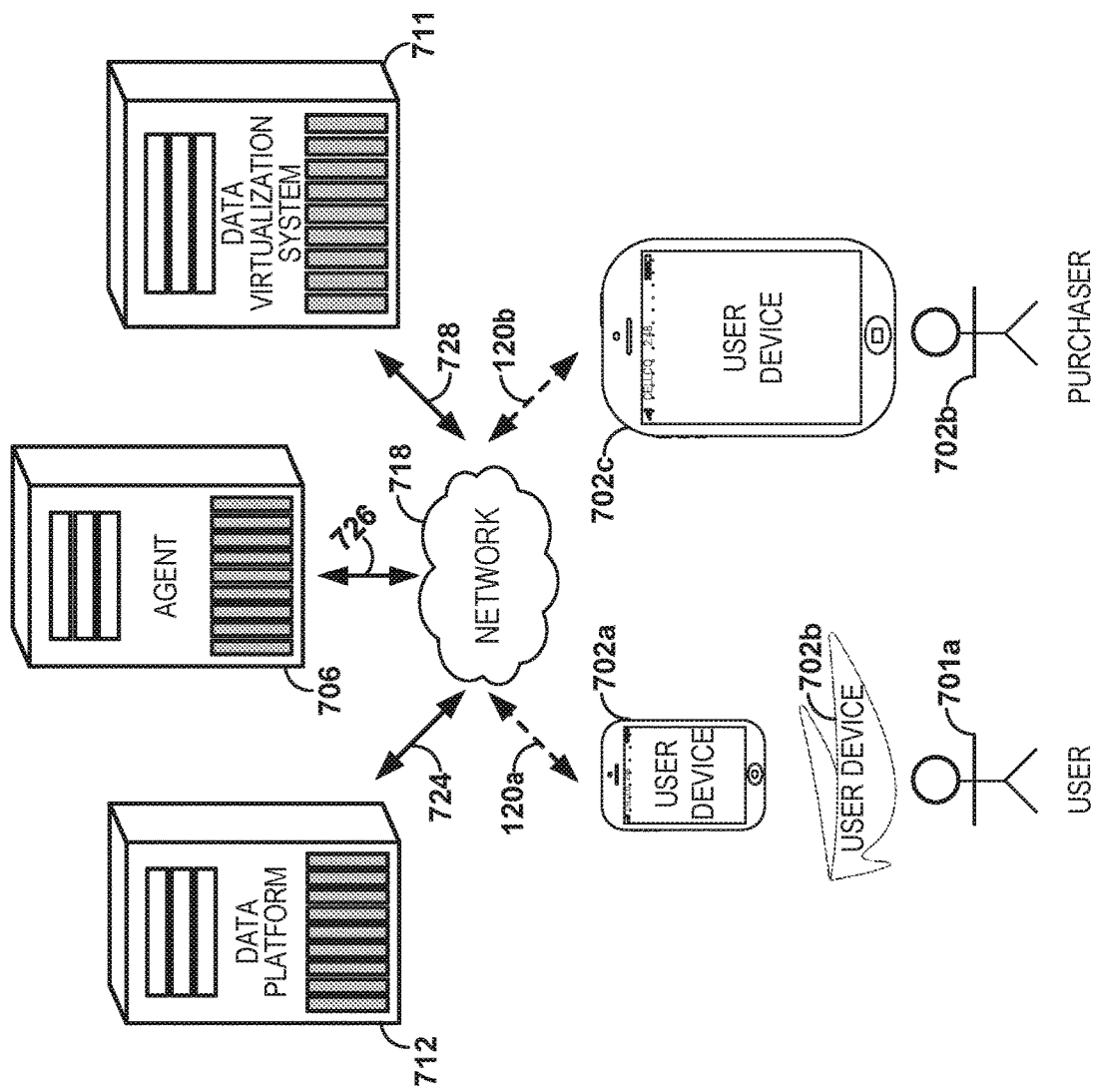
FIG. 7B schematically illustrates one embodiment of a user data transaction system.

FIG. 7B schematically illustrates one embodiment of a user data transaction system. The user data transaction system can be similar to the user data transaction system 100 described in FIG. 1. The systems and methods for securely exchanging user data based on privacy settings stored and implemented through the use of an agent (e.g., Agent 106 of FIG. 1) and other systems and components of the present disclosure can be implemented by one or more user devices 702a-702c (e.g., user device(s) 102 or purchaser device(s) 104 from FIG. 1 or the wearable display system 1000 of FIG. 7A), one or more agents 706 (e.g., the agent 106 from FIG. 1), one or more data platforms 712 (e.g., the data platform 112 from FIG. 1), and the data virtualization system 711 (e.g., the data virtualization system 111 from FIG. 1). In the non-limiting example embodiment shown in FIG. 7B, user 701a can operate user devices 702a and 702b (e.g., user device(s) 102 can include such devices) to create and modify their user privacy settings. In the non-limiting example embodiment shown in FIG. 7B, purchaser 701b can operate user device 702c to view, interact with, enrich with additional data, and analyze user data associated with user 701a or other users.

The user devices 702a-720c can include for example, cellular telephones, tablet computers, e-readers, smart watches, head mounted augmented, virtual, or mixed reality display systems, wearable display systems, the wearable display system 1000 of FIG. 7A, or the like. The user devices 702a-c can be in communication with other devices on a network 718 using a communication link 120a, 120b, for example a cellular communication link or an internet connection. The network 718 can be a local area network (LAN), wide area network (WAN), or the Internet, accessible by wired or wireless communication links, e.g., implementing the Institute of Electrical and Electronics Engineers (IEEE) 802.11 standards.

An agent 706, can be in communication with other devices on the network 718, for example the user devices 702a and 702b, using a communication link 126. A data platform 712, can be in communication with other devices on the network 718, for example, the agent 706. A data virtualization system 711, can be in communication with other devices on the network 718, for example, the agent 706 or user device 702c. The communication link 120a, 120b, 126, 724, 726, or 728 can be wired or wireless communications, cellular communication, Bluetooth®, local area network (LAN), wide local area network (WLAN), radio frequency (RF), infrared (IR), or any other communication methods or systems.

The user devices 702a and 702b can transmit encrypted user data to the data platform 712. The user devices 702a and 702b can also be used by the user 701a to configure or modify the user's 701a privacy settings via the agent 706, which may include a distributed ledger (e.g., the distributed ledger 108 of FIG. 1). The purchaser 702b can user the user device 702c (e.g., the purchaser device 104 of FIG. 1) to communicate with the data virtualization system 711 to interact with encrypted user data that is stored on the data platform.

ADDITIONAL IMPLEMENTATION DETAILS AND EMBODIMENTS

Various embodiments of the present disclosure may be a system, a method, or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, or in response to software instructions being executed by, one or more hardware processors or any other suitable computing devices. The software instructions or other executable code may be read from a computer readable storage medium (or mediums).

A computer readable storage medium can be a tangible device that can retain and store data or instructions for use by an instruction execution device. The computer readable storage medium may be, for example, but is not limited to, an electronic storage device (including any volatile or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network may comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, or may be invoked in response to detected events or interrupts. Computer readable program instructions configured for execution on computing devices may be provided on a computer readable storage medium, or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatus (systems), and computer program products according to embodiments of the disclosure. It will be understood that each block of the flowchart illustrations or block diagrams, and combinations of blocks in the flowchart illustrations or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions may also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart(s) or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart or block diagram block or blocks. For example, the instructions may initially be carried on a magnetic disk or solid-state drive of a remote computer. The remote computer may load the instructions or modules into the remote computer's dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

Thus, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, or fully or partially automated via, electronic hardware such application-specific processors (e.g., application-specific integrated circuits (ASICs)), programmable processors (e.g., field programmable gate arrays (FPGAs)), application-specific circuitry, or the like (any of which may also combine custom hard-wired logic, logic circuits, ASICs, FPGAs, etc. with custom programming/execution of software instructions to accomplish the techniques).

Any of the above-mentioned processors, or devices incorporating any of the above-mentioned processors, may be referred to herein as, for example, "computers," "computer devices," "computing devices," "hardware computing devices," "hardware processors," "processing units," or the like. Computing devices of the above-embodiments may generally (but not necessarily) be controlled or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
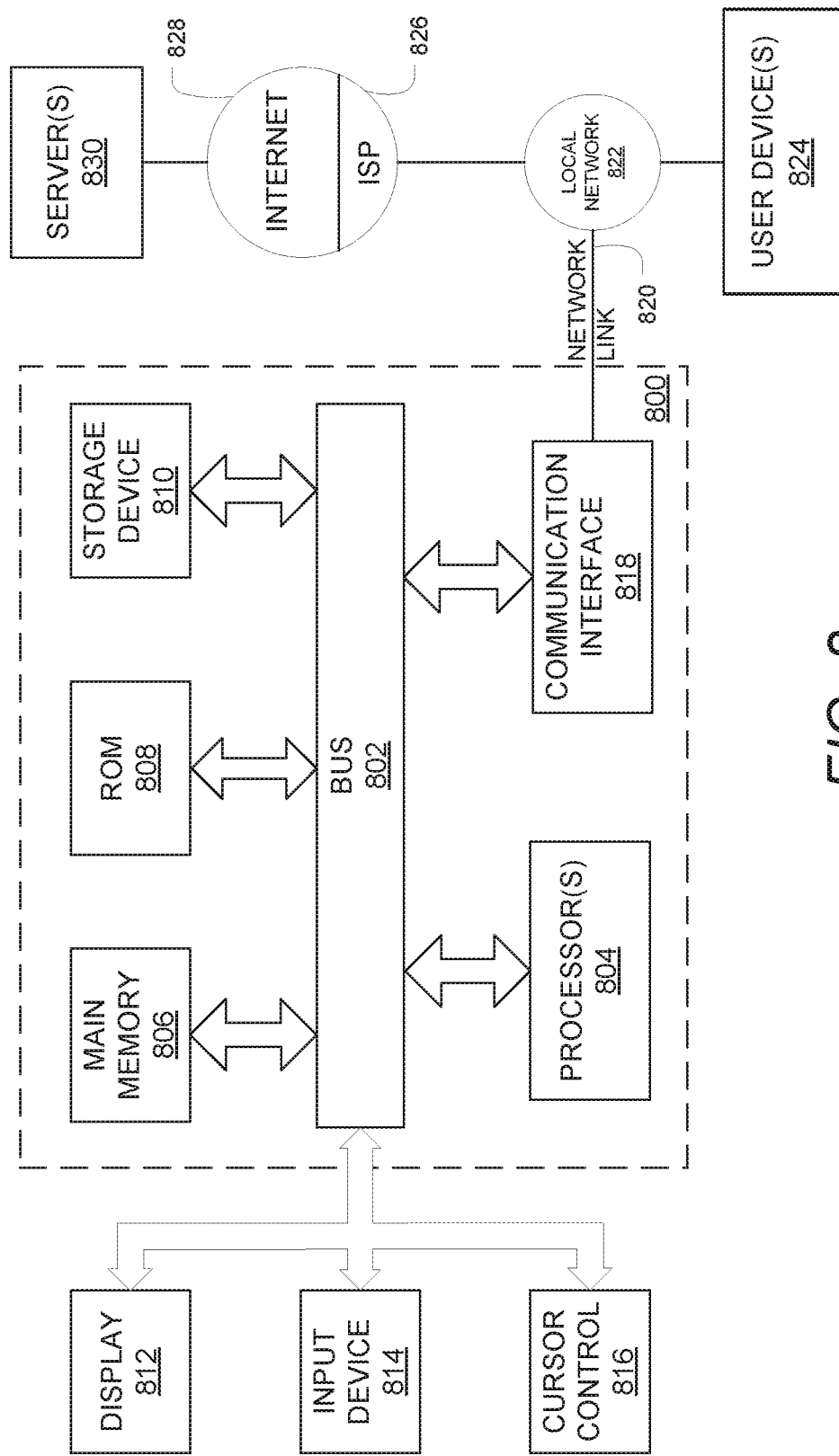
FIG. 8 illustrates a computer system with which certain methods discussed herein may be implemented.

For example, FIG. 8 is a block diagram that illustrates a computer system 800 upon which various embodiments may be implemented. Such a computer system 800 can include the portions of the agent, distributed ledger, user device(s), data platform, or data virtualization system as described herein. Computer system 800 can be used to implement the system described with reference to FIG. 7B. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. Computer system 800 may be coupled via bus 802 or network link 820 to user device(s) 824, which may include an augmented, mixed, or virtual reality display device such as, e.g., user devices 102, 104, 702a-702c, 1000. Further, the computer system 800 itself may also include an augmented, mixed, or virtual reality display device such as, e.g., user devices 102, 104, 702a-702c, 1000. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware or program logic that in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into the remote computer's dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a user device 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. For example, the server 830 may include some or all of the user data transaction system 100, the data visualization system 111, the agent 106, the data platform 112, or the user data privacy system 103.

The received code may be executed by processor 804 as it is received, or stored in storage device 810, or other non-volatile storage for later execution.

ADDITIONAL CONSIDERATIONS

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the webbrowser. User interfaces of certain implementations may be accessible through one or more dedicated software applications. In certain embodiments, one or more of the computing devices or systems of the disclosure may include mobile computing devices, and user interfaces may be accessible through such mobile computing devices (e.g., smartphones or tablets).

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In various embodiments, systems or computer systems are disclosed that comprise a computer readable storage medium having program instructions embodied therewith, and one or more processors configured to execute the program instructions to cause the one or more processors to perform operations comprising one or more aspects of the above- or below-described embodiments (including one or more aspects of the appended claims).

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "component," "agent," "module," "device," "mechanism," "unit," "element," "member," "apparatus," "machine," "processor," or "system" as used herein should not be construed to invoke means plus function claim language. For example, the elements described with such terms should be interpreted as capable of performing any claimed operations associated with the term(s) without the use or application of special or particular programming.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein and in the appended claims should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes that come within the meaning and range of equivalency of the claims are to be embraced within their scope.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

What is claimed is:

1. A user device comprising:
   one or more computer readable storage devices configured to store computer executable instructions;
   a head mounted display;
   sensors configured to detect surroundings of the user device;
   a network interface; and
   one or more hardware computer processors in communication with the one or more computer readable storage devices to execute the computer executable instructions to cause the user device to:
   receive privacy settings associated with a first user;
   transmit, to a distributed ledger manager via the network interface, the privacy settings for storage on a distributed ledger, wherein the distributed ledger manager comprises a distributed ledger and software configured to read and write to the distributed ledger;
   receive, from the distributed ledger manager via the network interface, a first public encryption key associated with the first user;
   collect, via the sensors, environment data associated with the user device, wherein the sensors are configured to detect surroundings of the user device;
   encrypt the environment data based on the first public encryption key;
   semantically tag the encrypted environment data with metadata, wherein the metadata indicates at least identifying information about the user device; and
   transmit, to a data platform via the network interface, the semantically tagged encrypted environment data, wherein the data platform comprises one or more databases.

2. The user device of claim 1, wherein an operator of the data platform will not have direct access to the environment data because the operator does not have an appropriate key to decrypt the environment data.

3. The user device of claim 1, wherein the first public encryption key is generated by the distributed ledger manager based at least in part on the privacy settings.

4. The user device of claim 1, wherein the sensors include one or more of: an accelerometer, a camera, and a GPS sensor.

5. The user device of claim 1, wherein the metadata is not encrypted.

6. A user device comprising:
one or more computer readable storage devices configured to store computer executable instructions;
a head mounted display; and
one or more hardware computer processors in communication with the one or more computer readable storage devices to execute the computer executable instructions to cause the user device to:
receive privacy settings associated with a first user;
transmit, to a distributed ledger manager, the privacy settings;
receive, from the distributed ledger manager, a first public encryption key associated with the first user;
collect, via one or more sensors, environment data associated with the user device;
encrypt the environment data based on the first public encryption key;
semantically tag the encrypted environment data with metadata, wherein the metadata indicates at least identifying information about the user device; and
transmit, to a data platform, the semantically tagged encrypted environment data.

7. The user device of claim 6, wherein the public encryption key is generated by the distributed ledger manager based at least in part on the privacy settings.

8. The user device of claim 6, wherein the one or more sensors are configured to detect surroundings of the user device.

9. The user device of claim 6, wherein the one or more sensors include one or more of: an accelerometer, a camera, and a GPS sensor.

10. The user device of claim 6, wherein the metadata is not encrypted.

11. The user device of claim 6, wherein the distributed ledger manager comprises a distributed ledger and software configured to read and write to the distributed ledger.

12. The user device of claim 6, wherein the data platform comprises one or more databases.

13. The user device of claim 6, wherein an operator of the data platform does not have an appropriate key to decrypt the environment data.

14. A method comprising:
receiving privacy settings associated with a first user;
transmitting, to a distributed ledger manager, the privacy settings;
receiving, from the distributed ledger manager, a first public encryption key associated with the first user;
collecting, via one or more sensors, environment data associated with a user device;
encrypting the environment data based on the first public encryption key;
semantically tagging the encrypted environment data with metadata, wherein the metadata indicates at least identifying information about the user device; and
transmitting, to a data platform, the semantically tagged encrypted environment data, wherein the data platform comprises one or more databases.

15. The method of claim 14, wherein the public encryption key is generated by the distributed ledger manager based at least in part on the privacy settings.

16. The method of claim 14, wherein the one or more sensors are configured to detect surroundings of the user device.

17. The method of claim 14, wherein the one or more sensors include one or more of: an accelerometer, a camera, and a GPS sensor.

18. The method of claim 14, wherein the metadata is not encrypted.

19. The method of claim 14, wherein the distributed ledger manager comprises a distributed ledger and software configured to read and write to the distributed ledger.

20. The method of claim 14, wherein an operator of the data platform does not have an appropriate key to decrypt the environment data.

* * * * *